(12) United States Patent
Koishi et al.

(10) Patent No.: US 10,774,884 B2
(45) Date of Patent: Sep. 15, 2020

(54) TORQUE TRANSMISSION DEVICE, BRAKING APPARATUS, AND POWER TRANSMISSION APPARATUS

(71) Applicants: WAKAYAMA PREFECTURE, Wakayama (JP); ACRO NAINEN CO., LTD., Wakayama (JP)

(72) Inventors: Hideyuki Koishi, Wakayama (JP); Hitoshi Torikai, Wakayama (JP); Satoshi Katsumoto, Wakayama (JP); Yoshinori Shimamoto, Wakayama (JP)

(73) Assignees: WAKAYAMA PREFECTURE, Wakayama (JP); ACRO NAINEN CO., LTD., Wakayama (JP)

( * ) Notice: Subject to any disclaimer, the term of this patent is extended or adjusted under 35 U.S.C. 154(b) by 50 days.

(21) Appl. No.: 16/201,086

(22) Filed: Nov. 27, 2018

(65) Prior Publication Data

US 2019/0093713 A1    Mar. 28, 2019

Related U.S. Application Data

(63) Continuation of application No. PCT/JP2016/070947, filed on Jul. 15, 2016.

(51) Int. Cl.
*F16D 35/00* (2006.01)
*F16D 57/00* (2006.01)
(Continued)

(52) U.S. Cl.
CPC .......... *F16D 35/005* (2013.01); *F16D 35/00* (2013.01); *F16D 57/007* (2013.01); *F16D 59/00* (2013.01); *F16D 2127/002* (2013.01)

(58) Field of Classification Search
CPC ......... F16D 2043/145; F16D 2127/002; F16D 43/14–18; F16D 35/00–35/029; F16D 59/00–59/02; F16D 57/007
See application file for complete search history.

(56) References Cited

U.S. PATENT DOCUMENTS

| 4,174,771 A * | 11/1979 | Hirt ........................ F16D 35/00 |
| | | 192/105 A |
| 4,850,246 A * | 7/1989 | Lanzer ................ B60K 17/351 |
| | | 74/655 |
| 9,587,687 B2 * | 3/2017 | Sesser .................... B05B 3/005 |

FOREIGN PATENT DOCUMENTS

| DE | 3814434 A1 * | 11/1988 | ............. F16D 35/00 |
| JP | 59-189930 | 12/1984 | |

(Continued)

OTHER PUBLICATIONS

International Search Report of PCT application No. PCT/JP2016/070947 dated Oct. 6, 2016; 6 pages.

*Primary Examiner* — Ernesto A Suarez
*Assistant Examiner* — Lillian T Nguyen
(74) *Attorney, Agent, or Firm* — Culpepper IP, LLLC; Kerry S. Culpepper

(57) ABSTRACT

Outer plates have a doughnut-like disk shape and are attached to the inner circumferential surface of a case member. On the other hand, inner plates have a substantially arc shape and are swingably supported about a position at a distance from the center of rotation of a shaft. The inner plates are held at a first position, at which the interlocking area between the outer plates and the inner plates is small, by a tension coil spring when the relative rotational speed between the case member and the shaft is small, and, when the relative rotational speed between the case member and the shaft exceeds a predetermined value are pivotally moved toward the outer plates by the shearing force of a viscous fluid and held at a second position at which the interlocking area between the movable plates and the first plates is large.

6 Claims, 12 Drawing Sheets

(51) Int. Cl.
*F16D 59/00* (2006.01)
*F16D 127/00* (2012.01)

(56) References Cited

FOREIGN PATENT DOCUMENTS

| | | |
|---|---|---|
| JP | 2-253018 | 10/1990 |
| JP | 3-46690 | 7/1991 |
| JP | H9-58287 | 3/1997 |
| JP | 53-22954 | 3/1998 |
| JP | 2000-213260 | 8/2000 |
| JP | 2013-148183 | 8/2013 |

* cited by examiner

TORQUE TRANSMISSION DEVICE, BRAKING APPARATUS, AND POWER TRANSMISSION APPARATUS

BACKGROUND OF THE INVENTION

Field of the Invention

The present invention relates to a torque transmission apparatus that generates, using the shearing force of a viscous fluid, torque corresponding to the speed of relative rotation between two shafts (hereinafter referred to as "relative rotational speed") so as to reduce the relative rotational speed, and also relates to a braking apparatus and a power transmission apparatus that include the torque transmission apparatus.

Description of the Related Art

A torque transmission apparatus is conventionally known that generates torque corresponding to the relative rotational speed between two shafts by using the shearing force of a viscous fluid. Also, a power transmission apparatus and a braking apparatus that include such a fluid-type torque transmission apparatus are also known.

An example of a power transmission apparatus that includes a fluid-type torque transmission apparatus is a viscous coupling for distributing driving power to main driving wheels (front wheels) and auxiliary driving wheels (rear wheels) in a part-time four-wheel-drive vehicle (see JP 119-58287).

The required characteristics of the viscous coupling mentioned above is that, in order to avoid tight corner braking during normal travel, the transmission torque transmitted to the auxiliary driving wheels is preferably small when the relative rotational speed is small (hereinafter, referred to as "low differential motion range"). On the other hand, if the main driving wheels skid during travel in adverse road conditions, it is necessary to transmit a large amount of driving power to the auxiliary driving wheels. Accordingly, the transmission torque transmitted to the auxiliary driving wheels needs to be large when the relative rotational speed is large (hereinafter, referred to as "high differential motion range").

However, in the conventional viscous coupling, it is difficult to obtain a large transmission torque in the high differential motion range while obtaining a sufficiently small transmission torque in the low differential motion range, and thus various adjustments have been made to the viscous coupling.

JP 119-58287 discloses a power transmission apparatus that includes both a viscous coupling and a dilatant fluid coupling. Dilatant fluids have properties where the shear resistance increases rapidly when the shear rate exceeds a certain value. Thus, by combining a dilatant fluid in parallel with a viscous coupling, it is possible to achieve a transmission torque that is large in the high differential motion range while it is sufficiently small in the low differential motion range.

Furthermore, JP 2013-148183 discloses a braking apparatus including a fluid-type torque transmission apparatus. The braking apparatus disclosed in this document is intended for use in a walking rollator or the like, and is desirably configured such that a brake is applied as lightly as possible during travel at low speeds, and is firmly applied during travel at high speeds for hazard prevention. Accordingly, as with the power transmission apparatus described above, the braking apparatus is required to provide a transmission torque that is large in the high differential motion range while being small in the low differential motion range.

In order to implement the requirement, according to JP 2013-148183, an inner rotor is surrounded by an outer rotor with a first space interposed therebetween, and the outer rotor is further sealed and surrounded by a drum via a liquid fluid contained in a second space. With this configuration, when the rotational speed of the rotational axis increases, the centrifugal force of the inner rotor causes a projecting/retracting member to advance and the outer rotor and the inner rotor to rotate integrally, as a result of which the rotary power of the rotating outer rotor is transmitted to the drum in a stationary state via the liquid fluid.

Furthermore, JP 2013-148183 is configured such that the power is reliably transmitted from the outer rotor to the drum by enclosing the dilatant fluid in the second space and increasing the viscosity of the dilatant fluid, along with an increase in the shear rate produced between the drum and the outer rotor when the centrifugal force of the inner rotor causes the projecting/retracting member to advance and the outer rotor and the inner rotor to integrally rotate.

However, it is difficult to use a dilatant fluid in a torque transmission apparatus because it requires a high level of skill in terms of manufacturing and management such as the technique for uniformly dispersing particles in the fluid and the technique for preventing the settling of particles.

Also, with the configuration of JP 2013-148183 that uses the viscosity of the fluid between the outer rotor and the drum by engaging the projecting/retracting member that has advanced from the inner rotor due to a centrifugal force with the outer rotor and integrally rotating the projecting/retracting member and the outer rotor, if the rotation speed of the inner rotor is slow, the centrifugal force is small, and it is therefore not possible to cause the projecting/retracting member to advance. Accordingly, it is difficult to operate the braking apparatus at a relatively low rotation speed.

Furthermore, it is necessary to fix the outer rotor to the vehicle main body and connect the inner rotor to a wheel. If the outer rotor is connected to a wheel, no centrifugal force acts on the projecting/retracting member, and thus the function as the braking apparatus is not exhibited.

BRIEF SUMMARY OF THE INVENTION

The present invention has been made in view of the problems described above, and it is an object of the present invention to implement a torque transmission apparatus that has desired transmission characteristics by using an ordinary viscous fluid without using a dilatant fluid that is difficult to handle.

In order to achieve the above object, a first torque transmission apparatus according to the present invention is a torque transmission apparatus that generates torque corresponding to a relative rotational speed between two shafts by using a shearing force of a viscous fluid so as to reduce a speed difference, the torque transmission apparatus including:

a case member that forms an operation chamber that contains the viscous fluid;

a shaft that is inserted through the case member so as to be capable of rotating relative to the case member;

a plurality of first plates that are connected to the case member; and a plurality of second plates that are connected to the shaft and provided spaced apart from the first plates in a thickness direction, wherein the first plates or the second plates are movable plates capable of swinging within a plane perpendicular to an axis of the shaft, and the movable plates held at a first position by an elastic member are moved to a second position against an elastic force of the elastic member by using a shearing force acting between plates by relative rotation, so as to switch an interlocking area between the plates and control a value of torque generated between the case member and the shaft.

A second torque transmission apparatus according to the present invention is a torque transmission apparatus that generates torque corresponding to a relative rotational speed between two shafts by using a shearing force of a viscous fluid so as to reduce a speed difference, the torque transmission apparatus including:

a case member that forms an operation chamber that contains the viscous fluid;

a shaft that is inserted through the case member so as to be capable of rotating relative to the case member;

a plurality of ring-shaped first plates having different diameters, the first plates being concentrically provided at a predetermined pitch and connected to the case member; and a plurality of ring-shaped second plates having different diameters, the second plates being concentrically provided at the same pitch as the first plates and configured to rotate along with rotation of the shaft and move in an axial direction of the shaft, wherein the second plates are movable plates capable of moving in the axial direction of the shaft, and the movable plates held at a first position by an elastic member are moved to a second position against an elastic force of the elastic member by using the shearing force of the viscous fluid generated by relative rotation, so as to switch an interlocking area between the plates and control a value of torque generated between the case member and the shaft.

Furthermore, the present invention encompasses a braking apparatus and a power transmission apparatus that include any of the torque transmission apparatuses described above.

According to the present invention, it is possible to implement a torque transmission apparatus that has the characteristics that a sufficiently small transmission torque is obtained in the low differential motion range, and a large transmission torque is obtained in the high differential motion range, by using an ordinary fluid such as a silicon oil without using a dilatant fluid that is difficult to handle.

Furthermore, the torque transmission apparatus according to the present invention has the characteristics that a change in the transmission torque caused by the relative rotational speed is amplified, and thus a braking apparatus or a power transmission apparatus that requires such characteristics can be implemented with a simple configuration using a widely used viscous fluid.

These and other objects, features and advantages of the present invention will become more apparent upon reading of the following detailed description along with the accompanied drawings.

DETAILED DESCRIPTION OF THE INVENTION

Figure 1:
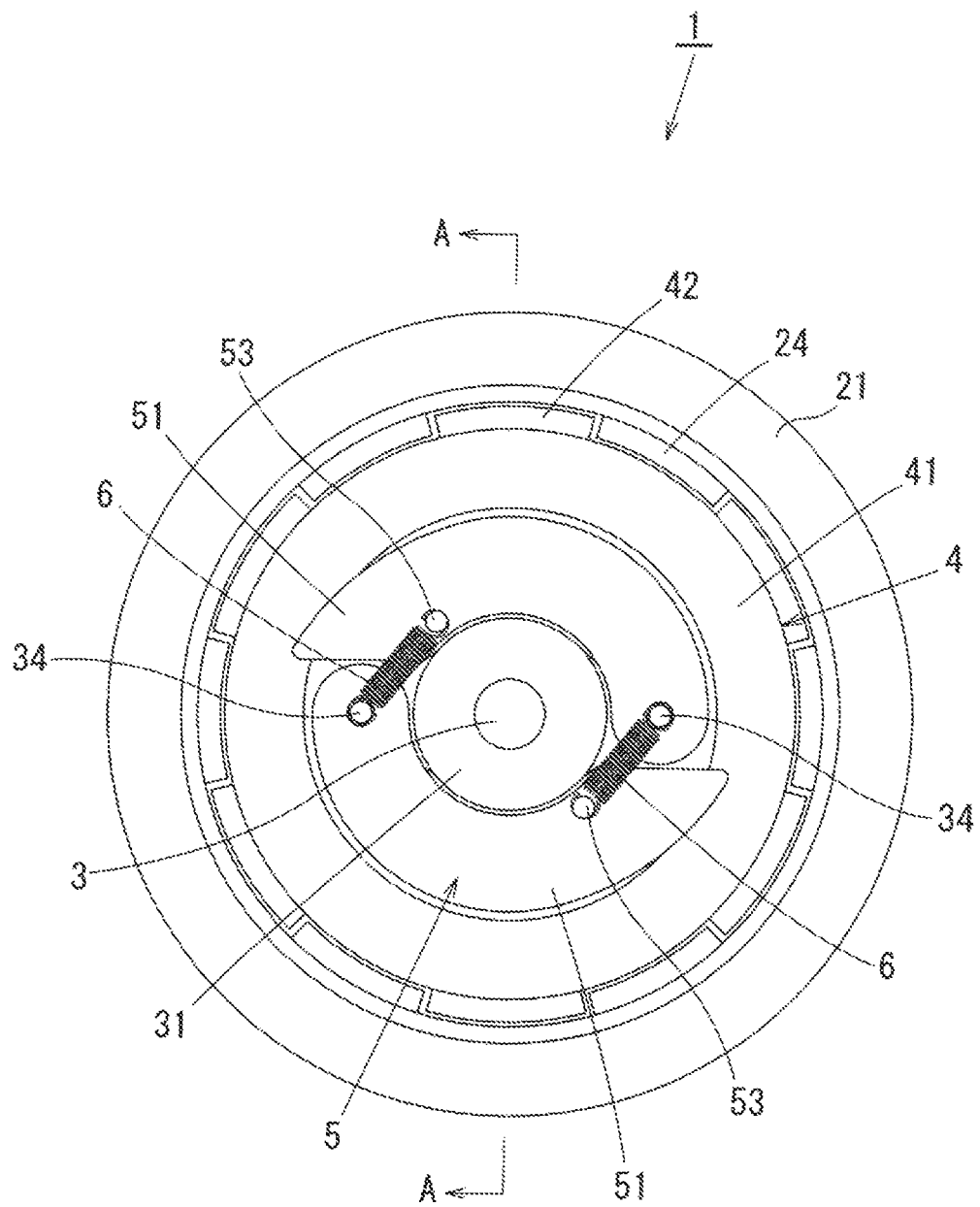
FIG. 1 is a front view of a torque transmission apparatus according to a first embodiment of the present invention when viewed from a shaft axial direction.

Hereinafter, a torque transmission apparatus according to an embodiment of the present invention will be described with reference to the drawings. Prior to the description of the embodiment, the basic configuration and operations of the torque transmission apparatus according to the present invention will be described.

A torque transmission apparatus according to the present invention includes a case member that forms an operation chamber that contains a viscous fluid, and a shaft and a plurality of outer plates and inner plates that are housed in the case member. For the sake of convenience of the description, an assembly of a plurality of outer plates (first plates) will be referred to as a "first plate member" and an assembly of a plurality of inner plates (second plates) will be referred to as a "second plate member".

A first plate member including a plurality of outer plates that are provided at a predetermined pitch is connected to the case member. On the other hand, a second plate member including a plurality of inner plates that are provided at the same pitch as that of the outer plates is connected to the shaft.

When the case member and the shaft are relatively rotated in a state in which the outer plates of the first plate member and the inner plates of the second plate member are alternately interlocked with a gap, the inner plates and the outer plates move relatively in the plane direction, and thus the inner plates and the outer plates are subjected to a shearing force that corresponds to the shear rate of the viscous fluid. Torque is generated between the case member and the shaft by the shearing force, which makes torque transmission possible.

The configuration described above is the same as that of a conventional torque transmission apparatus. When the relative rotational speed increases, the shearing force taken on by both plates also increases due to the increase in the shear rate of the viscous fluid. However, with this configuration, it is not possible to significantly change the transmission torque to a level that exceeds the viscosity characteristics of the viscous fluid.

Accordingly, in the present invention, either the inner plates or the outer plates are configured to be movable so as to change the area where both plates are subjected to the shearing force from the viscous fluid, and thus the transmission torque is changed significantly to a level that exceeds the viscosity characteristics of the viscous fluid.

Specifically, the change in the shearing force taken on by the plates is increased by displacing either the inner plates or the outer plates that are configured to be movable in a plane direction so as to change the overlapping area (the area of opposing faces with a gap interposed therebetween (hereinafter referred to as "interlocking area")) between the movable plates and the plates that remain fixed to the case member or the shaft.

The movable plates are biased by an elastic member to a first position at which the interlocking area is small, and thus a small transmission torque can be maintained unless a force that displaces the movable plates to a second position at which the interlocking area is large is generated against a biasing force applied by the elastic member.

Furthermore, according to the present invention, the shearing force generated by relative rotation acts in a direction to bias the movable plates to the second position. Even when the movable plates are held at the first position, the shearing force increases according to the viscosity characteristics of the viscous fluid with the increase in the relative rotational speed.

When a biasing force in a direction toward the second position that acts on the movable plates due to the shearing force exceeds a speed surpassing a biasing force in a direction of the first position due to the elastic member, displacement of the movable plates in the direction toward the second position starts. In response to the start of displacement, the shearing force further increases due to the increase in the interlocking area, and thus the movable plates reach the second position against the biasing force of the elastic member.

At the second position, the interlocking area is large, and it is therefore possible to achieve a large transmission torque surpassing the effect produced simply by the shear rate of the fluid increasing at the first position. On the other hand, when the relative rotational speed decreases, the shearing force also decreases, as a result of which the movable plates return to the first position due to the biasing force of the elastic member.

As described above, the torque transmission apparatus according to the present invention has the characteristics that a change in the transmission torque caused by the relative rotational speed is amplified, and thus a braking apparatus or a power transmission apparatus that requires such characteristics can be implemented with a simple configuration using a widely used viscous fluid.

First Embodiment

Figure 2:
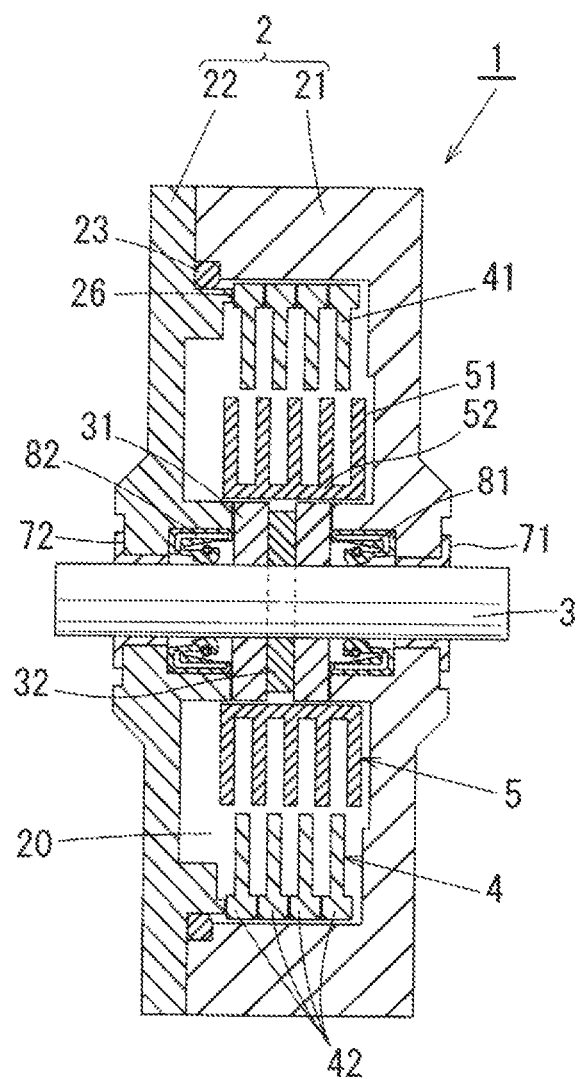
FIG. 2 is a cross-sectional view taken along the line A-A shown in FIG. 1.

FIG. 1 is a front view of a torque transmission apparatus according to a first embodiment of the present invention when viewed from a direction of the axis of a shaft 3 (hereinafter referred to as "axial direction"), and FIG. 2 is a cross-sectional view taken along the line A-A shown in FIG. 1. In order to clearly illustrate the internal structure, FIG. 1 shows a state in which a cap 22, an O-ring 23, a bush 72, and an oil seal 82 shown in FIG. 2 are removed.

A torque transmission apparatus 1 according to the present embodiment includes a case member 2, a shaft 3, a first plate member 4, a second plate member 5, and a tension coil spring 6, and further includes bushes 71 and 72 that are bearings, and oil seals 81 and 82 that are sealing members. Also, in the present embodiment, the inner plates that constitute the second plate member 5 are movable plates.

The bottomed cylindrical case member 2 is composed of a case 21 that has a cylindrical shape and a bottom surface, and a disk-shaped cap 22 that closes an open face of the case 21, and includes an operation chamber 20 that is an internal space. In the operation chamber 20, the first plate member 4 that is connected to the case member 2 and the second plate member 5 that rotates integrally with the shaft 3 are housed, and a viscous fluid is contained in the void of the operation chamber 20.

The shaft 3 is inserted through and supported by a hole formed at the center of the bottom surface of the case 21 and a hole formed at the center of the cap 22 via the bushes 71 and 72 so as to be capable of rotating relative to the case member 2.

Torque transmission occurs between the shaft 3 and the case member 2 that rotate relative to each other via the viscous fluid contained in the operation chamber 20. Specifically, each outer plate 41 of the first plate member 4 that is connected to the case member 2 and each inner plate 51 of the second plate member 5 that is connected to the shaft 3 are interlocked with a gap, and the gap is filled with the viscous fluid.

A counteracting shearing force is generated between both plates through relative rotation, and torque corresponding to the viscosity of the fluid and the relative rotational speed is generated between two shafts that are the shaft 3 and the case member 2, and thus the torque can be transmitted.

In the torque transmission apparatus 1 according to the present embodiment, when the relative rotational speed exceeds a predetermined value, the inner plates 51 are displaced, and the interlocking area between the inner plates 51 and the outer plates 41 increases. In the description given below, a state in which the interlocking area has increased will be referred to as a "high torque mode".

On the other hand, when the relative rotational speed decreases, and the transmission torque decreases, the inner plates 51 are displaced in the opposite direction by the biasing force of the tension coil spring 6, which is an elastic member, the interlocking area decreases, and the inner plates 51 return to an initial state. In the description given below, the initial state in which the interlocking area is small will be referred to as a "normal mode".

In the torque transmission apparatus 1 according to the present embodiment, bidirectional transition between the normal mode and the high torque mode is made possible by the relative rotational speed. Accordingly, fluctuations in the shearing force exceed fluctuations in the shearing force simply caused by fluctuations of the shear rate of the fluid, and it is possible to expand the fluctuation range of transmission torque according to the relative rotational speed.

The torque transmission apparatus 1 according to the present embodiment does not use centrifugal force, and thus the driving side may be the shaft 3 or may be the case member 2. In the case where the torque transmission apparatus 1 according to the present embodiment is used as a wheel braking apparatus, the torque transmission apparatus 1 may be configured such that the case member 2 is fixed to the vehicle body, and wheels are fixed to the shaft 3. However, a configuration is also possible in which the shaft 3 is fixed to the vehicle body and the case member 2 is used as a part of a wheel.

Next, the configuration and function of each member will be described. First, the first plate member 4 will be described. On the inner surface side of the cylindrical wall of the case 21, a plurality of doughnut-like disk-shaped outer plates 41 are provided at a predetermined pitch in the axial direction, each outer plate 41 having an outer shape and a hole that are concentric about a point on the axis of the shaft 3. In the present embodiment, the first plate member 4 is composed of four outer plates 41, but the number of outer plates can be changed as appropriate according to the required torque characteristics, together with the number of inner plates that constitute the second plate member 5, which will be described later.

Figure 3:
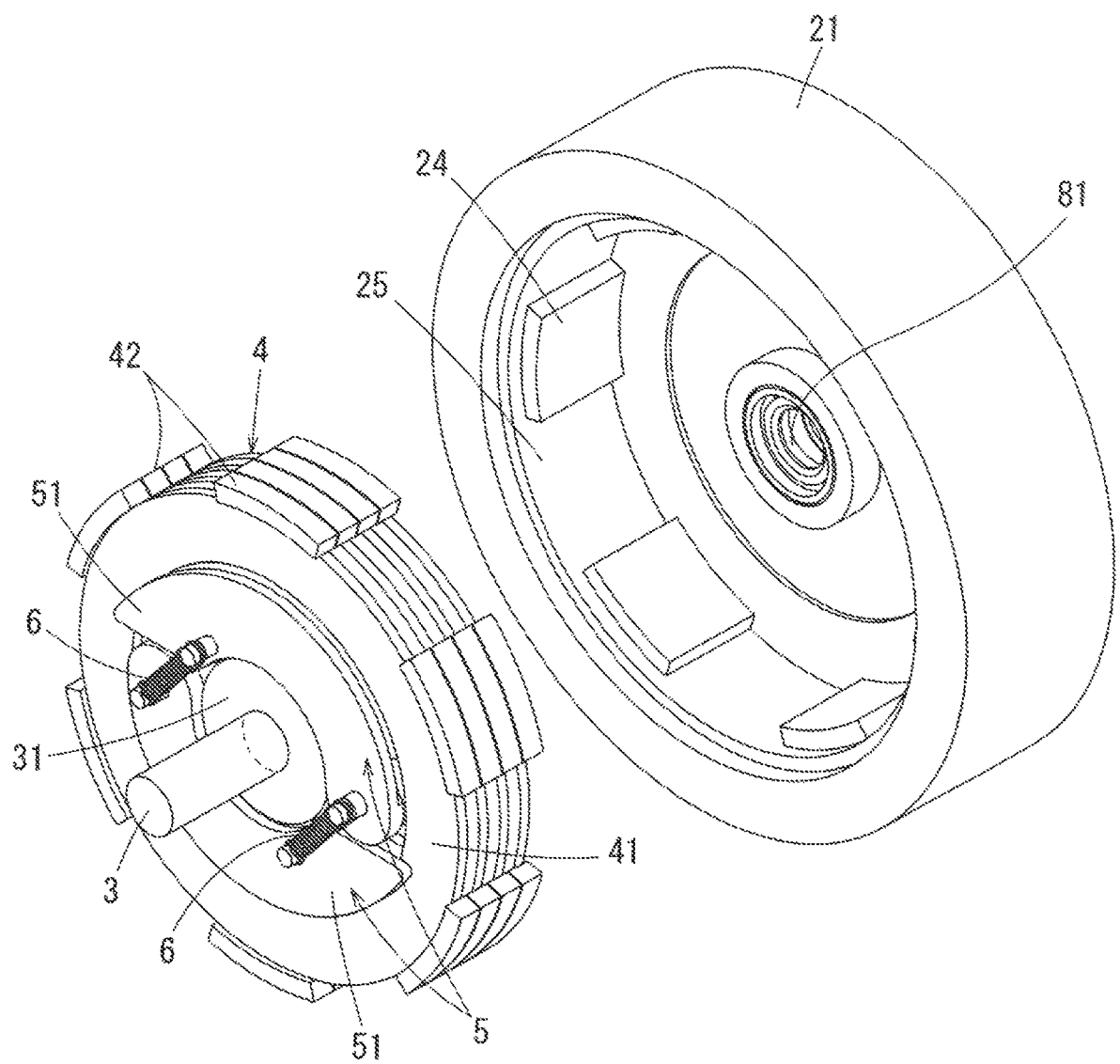
FIG. 3 is a perspective view of first and second plate members shown in FIG. 1, which are removed from a case.

FIG. 3 is a perspective view of the first plate member 4 and the second plate member 5 removed from the case 21. The outer edge portion of each of the outer plates 41 that constitute the first plate member 4 includes, around the entire circumference thereof, plate fixing projections 42 that protrude radially from the outer edge. On the other hand, on the inner surface of the cylindrical wall of the case 21, protrusion portions 24 and recess portions 25 are alternately provided.

The diameter of the protrusion portions 24 substantially matches the diameter of the outer edge of the outer plates 41, and the diameter of the recess portions 25 substantially matches the diameter of the outer edge of the plate fixing projections 42. Also, the circumferential length of the recess portions 25 substantially matches the circumferential length of the plate fixing projections 42. Accordingly, the first plate member 4 including the plate fixing projections 42 can be fit inserted to the case 21 including the protrusion portions 24 and the recess portions 25 so as to be incapable of rotating relative to the case 21.

With this configuration, the first plate member 4 is integrally connected to the case 21. Accordingly, rotation with the second plate member 5 does not occur when the case 21 and the shaft 3 rotate relative to each other, and thus the torque generated by the shearing force received from the viscous fluid can be transmitted to the case member 2.

Furthermore, as shown in FIG. 2, the plate fixing projections 42 have a dimension in the thickness direction larger than the thickness of the outer plates 41. The four outer plates 41 abut against each other at their plate fixing projections 42, and are sandwiched between the bottom surface of the case 21 and a positioning projection 26 provided on the cap 22. Accordingly, the outer plates 41 can be positioned at a predetermined interval by adjusting the thickness of the plate fixing projections 42.

The pitch of the four outer plates 41 is the sum of the thickness of an outer plate 41, the thickness of an inner plate 51 that is interlocked with the outer plate 41, and the thickness of two gaps that are filled with the viscous fluid that generates shear resistance between both plates.

Figure 4:
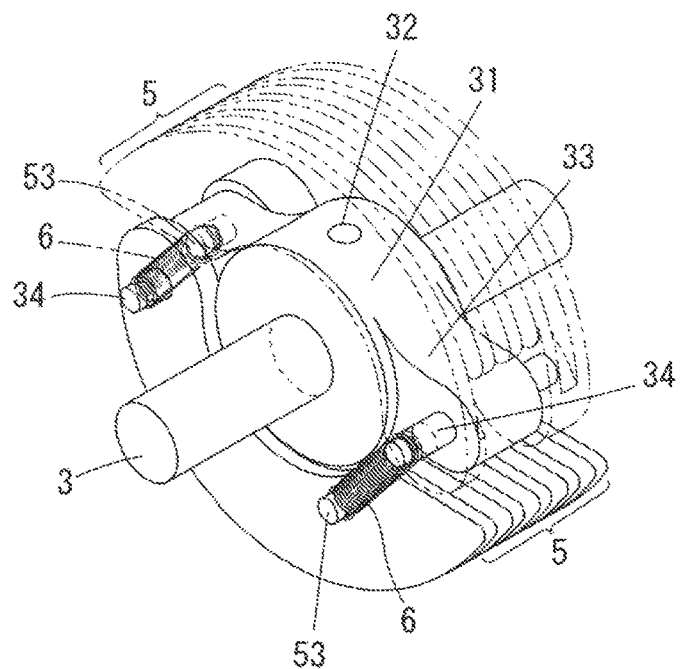
FIG. 4 is a perspective view of the second plate members in a normal mode.
Figure 5:
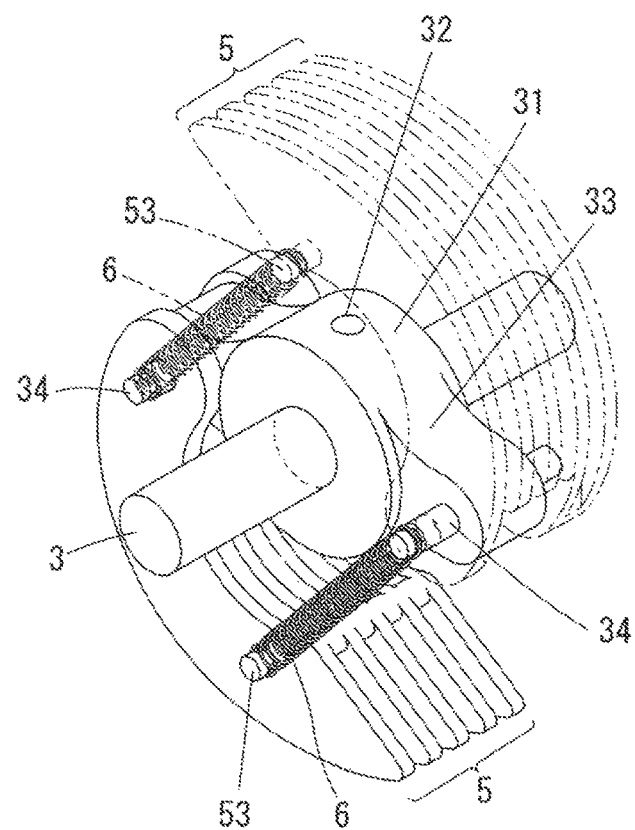
FIG. 5 is a perspective view of the second plate members in a high torque mode.

Next, the shaft 3 and the second plate member 5 that integrally operates with the shaft 3 during relative rotation will be described with reference to FIGS. 1 to 3 explained above, and FIGS. 4 and 5. FIG. 4 is a perspective view of the second plate members 5 in the normal mode. FIG. 5 is a perspective view of the second plate members 5 in the high torque mode. In the diagrams, for the sake of visibility, the upper second plate member 5 is indicated by an imaginary line.

As shown in FIGS. 4 and 5, the shaft 3 is inserted through a shaft insertion hole formed at the center of a hub 31. Also, the hub 31 is fixed to the shaft 3 by press fitting a hub fixing pin 32 that passes from the center in the axis direction of a cylindrical side surface of the hub 31, through the axis of the shaft 3, and to the other side of the cylindrical side surface of the hub 31. With this configuration, even when torque is generated, the hub 31 can be integrally rotated with the shaft 3, or can keep a stopped state.

In the present embodiment, a pair of arms 33 for supporting swing shafts 34 are provided at two locations (the positions rotated 180 degrees about the axis of the shaft 3) on the cylindrical side surface of the hub 31. In each arm 33, a swing shaft support hole is formed in parallel to the axis of the shaft 3 at a position at a predetermined distance from the axis of the shaft 3, and a swing shaft 34 is fixedly inserted through the swing shaft support hole.

The inner plates 51 that constitute each second plate member 5 have a substantially semicircular shape when viewed from the axial direction, and each inner plate 51 includes, at one end portion thereof, a hole through which the swing shaft 34 is inserted. As a result of the swing shaft 34 being passed through this hole and the swing shaft support hole formed in the hub 31, the second plate member 5 is supported on the hub 31 so as to be capable of swinging within a plane perpendicular to the shaft 3.

As shown in FIG. 2, a plurality of inner plates 51 that constitute the second plate member 5 are provided at a predetermined pitch in the axial direction. In the present embodiment, two second plate members 5 are disposed to have rotational symmetry with respect to the axis of the shaft 3, each second plate member 5 including five inner plates 51 that are integrally connected by a connecting member 52 on the inner side.

In the present embodiment, the connecting member 52 also functions as a stopper that limits the range of movement of the second plate member 5 on the second position side. Specifically, when the interlocking area between the first plate member 4 and the second plate member 5 increases in the high torque mode, the leading end of each inner plate 51 is interposed, in a gap, between two adjacent outer plates 41, but when the leading ends of the outer plates 41 abut against the connecting member 52, the second plate member 5 cannot be displaced beyond this position. Accordingly, in the high torque mode, relative rotation is performed while the leading ends of the outer plates 41 and the connecting member 52 slide against each other.

Although the sliding friction is not high due to the lubricating function of the viscous fluid, existing measures against abrasion may be taken. Also, a stopper for delimiting the swing angle may also be additionally provided between the second plate member 5 and the hub 31. In this case, it is possible to prevent wear while avoiding sliding between the first plate member 4 and the second plate member 5.

The diameter of the substantially semicircular inner curved surface of the inner plates 51 substantially matches the diameter of the cylindrical side surface of the hub 31, and as shown in FIG. 4, in the normal mode, the inner plates 51 are disposed so as to cover the cylindrical side surface of the hub 31 counterclockwise from their end portion that is supported on the hub 31 by the swing shaft 34 toward the other swing shaft.

A hook 53 is provided near the leading end of the second plate member 5, and a tension coil spring 6 that is an elastic member is provided between the hook 53 and the other swing shaft 34, and the second plate member 5 is biased in the direction of the axis of the shaft 3. Accordingly, in the normal mode, a state is kept in which the inner curved surface of the inner plates 51 abut against the cylindrical side surface of the hub 31.

In the present embodiment, a tension coil spring is used as an elastic member, but the elastic member is not limited thereto as long as it is possible to bias the second plate member 5 in the direction of the axis of the shaft 3. For example, a torsion spring may be used to generate a biasing force between the second plate member 5 and the hub 31 about the swing shaft 34.

As shown in FIG. 1, in the normal mode, the outer curved surface of each inner plate 51, excluding the leading end portion, is on a circle centered on the axis of the shaft 3 when viewed from the axial direction. That is, the outer curved surface of each inner plate 51, excluding the leading end portion, has an arc shape that is concentric with the inner curved surface. Accordingly, in the normal mode in which the inner curved surface abuts against the cylindrical side surface of the hub 31 that has the same diameter, the center of the arc of the outer curved surface is positioned on the axis of the shaft 3. Thus, in the normal mode, the outer curved surface of each inner plate 51, excluding the leading end portion, has a perfect circular shape centered on the axis of the shaft 3 when viewed from the axial direction.

Also, the outer curved surface of each inner plate 51 is smaller than the diameter of the inner curved surface of the outer plate 41, and thus each of the inner plates 51, excluding the leading end portion, do not interlock with the outer plates 41, and thus the shearing force of the fluid is small. Accordingly, the transmission torque in the normal mode can be reduced.

The leading end portion of each inner plate 51 has a shape that protrudes radially from the remaining portion, and thus interlocks with the outer plate 41 even in the normal mode. Accordingly, the leading end portion of the inner plate 51 interlocked with the outer plate 41 is subjected to the shearing force of the fluid due to differential motion, which causes a moment about the swing shaft 34 and biases the inner plate 51 radially outward (in a direction in which the interlocking area increases).

With the configuration described above in which only the leading end portion of the inner plate 51 is interlocked with the outer plate 41 in the normal mode, the distance between the line of action of the shearing force and the swing shaft 34 can be increased, and thus a moment that displaces the second plate member 5 in a direction to increase the interlocking area about the swing shaft 34 is likely to be generated. Also, a portion of the inner plate 51 other than the leading end portion does not interlock with the outer plate 41, and thus a shearing force is unlikely to be generated, and the transmission torque can be minimized.

Accordingly, by using a braking apparatus including the torque transmission apparatus configured as described above in a walking rollator, a wheelchair or the like, the load during normal travel can be reduced, and a brake can be reliably applied when an excessive speed is reached.

Also, in the normal mode, the portion of the second plate member (inner plate 51) other than the leading end portion may be interlocked with the outer plate 41. In this case, the torque transmission apparatus can be used in a power transmission apparatus that requires a certain degree of transmission torque even in the normal mode.

In the present embodiment, transition between the normal mode and the high torque mode is made possible by swinging the movable plates about the swing shaft, and thus the location where sliding resistance occurs on the movable plates during transition between modes can be limited to the vicinity of the swing shaft. On the other hand, the present embodiment is configured such that the shearing force generates a moment that swingably moves the movable plates to the second position, and thus the moment of the sliding resistance can be reduced with respect to the moment generated by the shearing force, and a stable transition between modes can be achieved.

Also, in the present embodiment, the inner plates 51 are configured as movable plates. Accordingly, the interlocking position where both plates are interlocked in the high torque mode can be set to a position distant from the shaft rotational axis. At the position distant from the shaft, the relative speed between two plates is high, and thus the shearing force is large. Also, because torque is equal to the product of force and distance, the transmission torque increases as the distance of the location where a shearing force occurs from the rotational axis increases. Accordingly, the torque transmission apparatus according to the present embodiment can provide a large transmission torque in the high torque mode while having a compact size.

In the present embodiment, two second plate members 5 are provided so as to have 180 degree rotational symmetry about the axis. However, if the shearing force generated in the second plate member 5 by relative rotation can displace the second plate member 5 against the biasing force of the tension coil spring 6 in a direction in which the interlocking area increases, for example, three second plate members 5 may be provided so as to have 120 degree rotational symmetry. Also, four or more second plate members 5 may be provided. Conversely, only one second plate member 5 may be provided by removing one second plate member 5 from the configuration of the present embodiment. Even with this configuration, the advantageous effects of the present invention can be obtained.

The torque transmission apparatus 1 according to the present embodiment is used by filling the operation chamber 20 with a viscous fluid. Accordingly, in order to prevent the leakage of the fluid, as shown in FIG. 2, an O-ring 23 is placed on the joint face between the case 21 and the cap 22, and oil seals 81 and 82 are placed between the cap 22 and the shaft 3 and between the case 21 and the shaft 3, respectively. The case 21 and the cap 22 can be joined using a known fastening means such as a bolt.

Next, the normal mode, the high torque mode, and the mechanism of transition between the two modes according to the present embodiment will be described.

Figure 6:
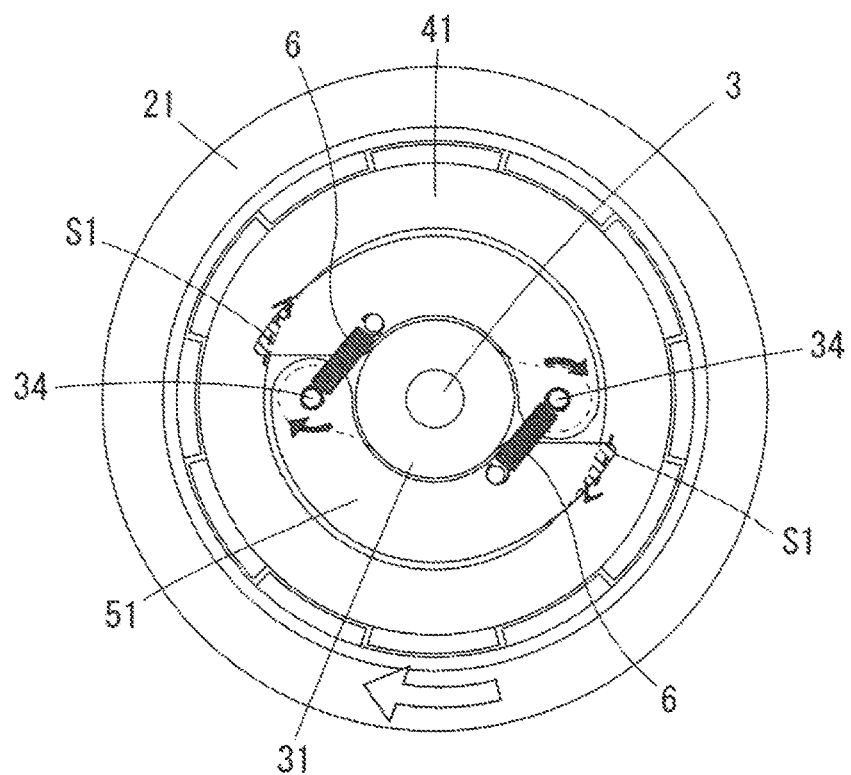
FIG. 6 is a front view of the torque transmission apparatus in the normal mode when viewed from the shaft axial direction.
Figure 7:
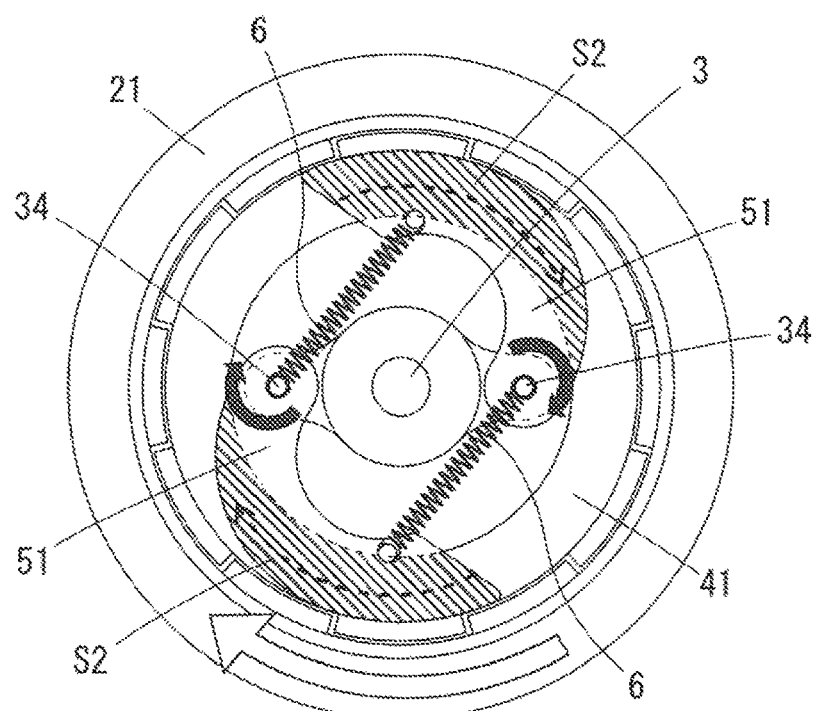
FIG. 7 is a front view of the torque transmission apparatus in the high torque mode when viewed from the shaft axial direction.

FIGS. 6 and 7 are diagrams of the torque transmission apparatus 1 in the normal mode and the high torque mode when viewed from the axial direction, respectively. As in FIG. 1, these diagrams show a state in which the cap 22, the O-ring 23, the bush 72, and the oil seal 82 are removed.

Figure 8:
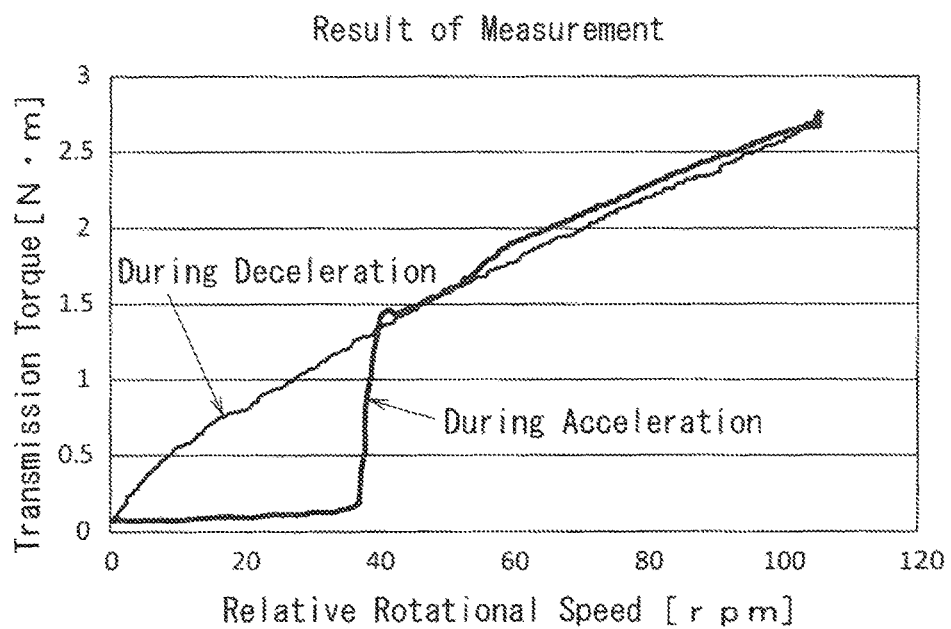
FIG. 8 is a graph showing measured values of torque transmitted from a shaft to a case member when the relative rotational speed is changed in the torque transmission apparatus according to the first embodiment.

FIG. 8 is a graph showing measured values of torque transmitted from the shaft 3 to the case member 2 when the relative rotational speed is changed in the torque transmission apparatus 1 according to the present embodiment shown in FIGS. 1 and 2.

For measurement, a torque transmission apparatus 1 whose operation chamber with an inner diameter of 71.2 mm and a dimension in the axial direction of 20 mm was filled with a silicon oil (product number: KF96-10000CS) available from Shin-Etsu Chemical Co., Ltd. was used. Then, a motor connected to the case member 2 was rotated with the shaft 3 being fixed, and torque was measured using a torque sensor attached to the shaft 3.

During measurement, the relative rotational speed was increased from a stopped state to 105 rpm at a rate of acceleration of 2.5 rpm per second, and thereafter decreased to the stopped state at a rate of acceleration of −2.5 rpm. In FIG. 8, the thick line indicates relative rotational speed in relation to transmission torque characteristics during acceleration, and the thin line indicates relative rotational speed versus transmission torque characteristics during deceleration.

As shown in FIG. 6, in the normal mode in which the relative rotational speed is low, interlocking areas 51 (indicated by hatching) between the outer plate 41 and each inner plate 51 are very small, and thus the shearing force (indicated by a dashed arrow) taken on by the inner plate 51 from the fluid is small. Accordingly, a clockwise moment (indicated by a black arrow) that acts on the inner plate 51 about the swing shaft 34 due to the shearing force is small.

On the other hand, the inner plate 51 is biased in the direction of the axis of the shaft 3 by the tension coil spring 6. With the biasing force of the tension coil spring 6, a counterclockwise moment about the swing shaft 34 acts on the inner plate 51.

In the normal mode in which the relative rotational speed is low, the clockwise moment generated by the shearing force is smaller than the counterclockwise moment generated by the tension coil spring 6, and thus the relative rotation occurs while the inner curved surface of the inner plate 41 abuts against the cylindrical side surface of the hub 31. Accordingly, in the normal mode in which the relative rotational speed is low, a state in which the interlocking area is small can be maintained, and the transmission torque can be reduced. As shown in FIG. 8, the transmission torque at this time is about 0.1 Nm.

In the normal mode, the shear rate of the fluid between plates increases as the relative rotational speed increases, and thus the shearing force that acts on the inner plate 51 increases according to the viscosity characteristics of the fluid. As a result, the clockwise moment generated by the shearing force increases, and eventually, exceeds the counterclockwise moment generated by the tension coil spring 6. As a result, the inner plate 51 is displaced outward, and transition is made to the high torque mode shown in FIG. 7.

As shown in FIG. 7, in the high torque mode, interlocking areas S2 (indicated by hatching) are large, and thus a large shearing force acts on the outer plates 41 and the inner plates 51. Accordingly, the transmission torque produced between the case member 2 and the shaft 3 takes a large value surpassing the amount of increase in transmission torque caused by simply increasing the shear rate of the fluid.

As shown in the graph in FIG. 8, from a point in time at which the relative rotational speed exceeded about 35 rpm, the transmission torque changed rapidly from about 0.2 Nm to about 1.5 Nm according to the outward displacement of the inner plates 51. After that, the operation transitioned to the high torque mode, and the transmission torque increased as the relative rotational speed increased. Ultimately, the transmission torque reached about 2.7 Nm.

Next, the transition from the high torque mode to the normal mode will be described. In the high torque mode, when the relative rotational speed decreases, the shear rate of the fluid decreases, as a result of which the shearing force that biases the inner plates 51 clockwise decreases as the transmission torque decreases. Then, when the counterclockwise moment generated by each tension coil spring 6 exceeds the clockwise moment generated by the shearing force, displacement of the inner plate 51 in the direction of the axis of the shaft 3 starts.

When a state in which the relative rotational speed is low continues, due to the biasing force of the tension coil springs 6, the inner plates 51 return to the state shown in FIG. 6, or in other words, a state in which the inner curved surface abuts against the cylindrical side surface of the hub 31. As described above, when the relative rotational speed decreases, the mode returns to the normal mode in which the transmission torque is small.

As shown in FIG. 8, the inner plates 51 are at the second position at the start of deceleration, and thus the shearing force is large, and the inner plates 51 are held at the second position even at a lower speed than the relative rotational speed at which the transmission torque changes rapidly during acceleration. However, with further deceleration, the shearing force decreases, and the biasing force applied by the elastic member dominates. Accordingly, the inner plates 51 are returned to the first position by the time the relative rotational speed reaches 0, and the mode transitions to the normal mode.

Also, during deceleration, the transmission torque slowly decreases. In the case where the torque transmission apparatus is used as a braking apparatus for a walking rollator or the like, it is preferable that the brake is not released until the speed has sufficiently decreased. Accordingly, the torque transmission apparatus 1 according to the present embodiment is suitable for use as a braking apparatus for a walking rollator or the like.

As shown in FIG. 1, in the present embodiment, two second plate members 5 are provided at positions that have 180 degree rotational symmetry about the axis of the shaft 3, and each plate member 5 can transition to the high torque mode when the case member 2 makes a clockwise differential motion (forward rotation) with respect to the shaft 3.

When a differential motion in a direction opposite to the clockwise direction occurs, the shearing force acts against the forward rotation, and thus the biasing force applied to each inner plate 51 by the shearing force acts in the same direction as the biasing force generated by the tension coil spring 6. Accordingly, in the case of backward rotation, even when the relative rotational speed increases, a low transmission torque can be maintained while the mode is in the normal mode.

Accordingly, if the torque transmission apparatus 1 according to the present embodiment is used as, for example, a viscous coupling for distributing driving power to main driving wheels (front wheels) and auxiliary driving wheels (rear wheels) in a part-time four-wheel-drive vehicle, it is possible to prevent the power transmission apparatus from being damaged even when a rear wheel-side propeller shaft rotates at a high speed, without using a one-way clutch in combination.

That is, with a power transmission apparatus in which a conventional viscous coupling is used, it is not possible to fix the front wheels to a tow truck when towing is to be performed. Specifically, with a conventional viscous coupling, a torque corresponding to the relative rotational speed is transmitted in both cases of forward rotation and backward rotation. Accordingly, when towing is performed by fixing the front wheels, a state in which the differential motion is large continues for a long time, and the power transmission apparatus may be damaged.

In contrast, with a power transmission apparatus in which the torque transmission apparatus 1 according to the present embodiment is used, when the front wheels skid and rotate at a high speed (forward rotation), transition is made to the high torque mode, and thus a high torque can be transmitted. On the other hand, when the rear wheels rotate at a high speed (backward rotation), a low transmission torque is maintained, and thus the load applied to the power transmission apparatus is small, and the likelihood of damage can be reduced.

Second Embodiment

A torque transmission apparatus 1a according to a second embodiment of the present invention will be described next with reference to FIGS. 9 to 11. In the diagrams, members that have the same functions as those of the first embodiment are given the same reference numerals or reference numerals with alphabetical characters. The same applies hereinafter.

As in the first embodiment, the torque transmission apparatus 1a according to the present embodiment uses movable plates as the inner plates that constitute the second plate member. However, the arrangement of the movable plates is different from that of the first embodiment.

Figure 9:
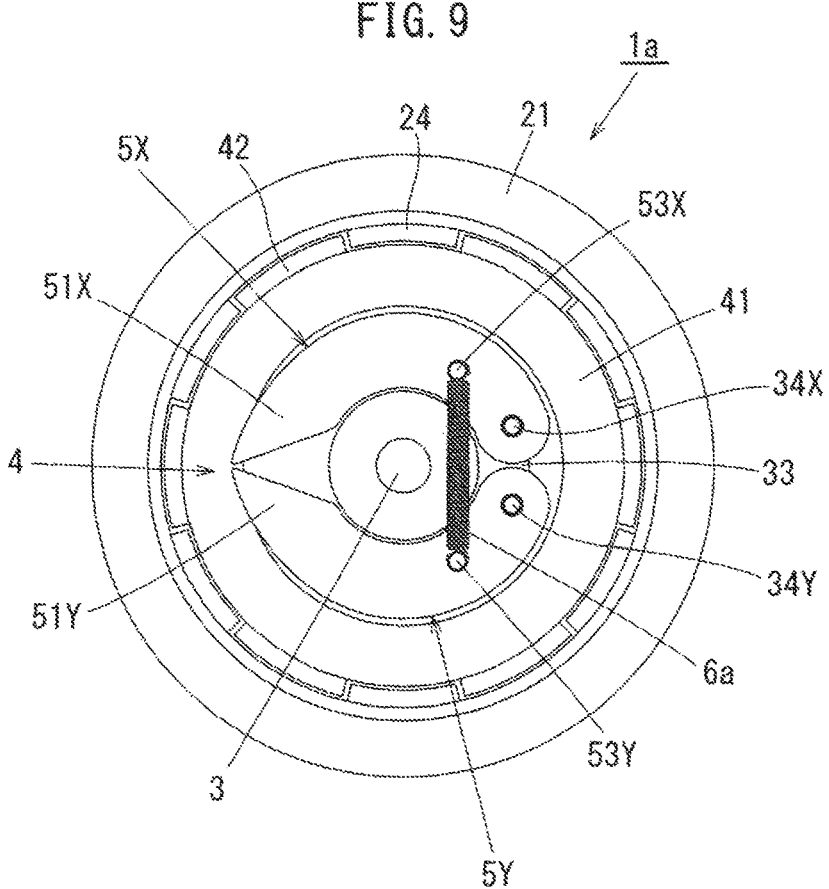
FIG. 9 is a front view of a torque transmission apparatus according to a second embodiment of the present invention when viewed from the shaft axial direction.

FIG. 9 is a front view of the torque transmission apparatus 1a in the normal mode when viewed from the axial direction. FIG. 10 is a front view of the same in the high torque mode when the case member 2 is relatively rotated clockwise with respect to the shaft 3 (forward rotation), and FIG. 11 is a front view of the same in the high torque mode when the case member 2 is relatively rotated counterclockwise with respect to the shaft 3 (backward rotation). As in FIG. 1, a state is shown in which the cap 22, the O-ring 23, the bush 72, and the oil seal 82 are removed.

In the first embodiment described above, two second plate members 5 are provided so as to be rotational symmetric with respect to the axis of the shaft 3. Accordingly, in the first embodiment, transition to the high torque mode can be made only in the case of forward rotation.

In contrast, the present embodiment is configured such that two sets of inner plates 51 are provided at positions that are plane symmetric with respect to a plane (the horizontal plane in FIG. 9) including the axis of the shaft 3, which allows transition to the high torque mode to be made in the case of relative rotation in both forward and backward directions.

Specifically, two swing shaft support arms 33 are provided in the first embodiment, but in the present embodiment, one arm 33 is provided. In the arm 33, a swing shaft 34X of a second plate member 5X operated during forward rotation and a swing shaft 34Y of a second plate member 5Y operated during backward rotation are provided so as to be plane symmetric with respect to the horizontal plane.

In the normal mode shown in FIG. 9, the second plate member 5X is disposed so as to cover the upper side of the cylindrical side surface of the hub 31 counterclockwise from an end portion supported on the hub 31 by the swing shaft 34X. Likewise, the second plate member 5Y is also disposed, in the normal mode, so as to cover the lower side of the cylindrical side surface of the hub 31 clockwise from an end supported on the hub 31 by the swing shaft 34Y, and is plane symmetric with respect to the horizontal plane.

Also, hooks 53X and 53Y are provided at positions that are plane symmetric in the two inner plates 51X and 51Y, and a tension coil spring 6a is provided between the two hooks 53X and 53Y, and thus the two second plate members 5X and 5Y are both biased in a direction toward the axis of the shaft 3.

Next, the normal mode, two types of high torque modes for forward rotation and backward rotation, and the mechanism of transition between two modes according to the present embodiment will be described.

In the case of forward rotation in which the case member 2 relatively rotates clockwise with respect to the shaft 3, in the second plate member 5X, a clockwise moment about the swing shaft 34X is generated by the shearing force. However, in a low differential motion range in which the relative rotational speed is low, the clockwise moment is small, and thus cannot displace an inner plate 51X against the counterclockwise moment generated by the biasing force of the tension coil spring 6a.

Also, in the case of forward rotation, a moment generated by the biasing force of the tension coil spring 6a and a moment generated by the shearing force are both clockwise moments, and a moment about the swing shaft 34Y that acts on the second plate member 5Y acts in a direction to press the inner plate 51Y against the cylindrical side surface of the hub. Accordingly, in the case of forward rotation, the inner plate member 51Y is not displaced from the position in the normal mode.

Accordingly, in the low differential motion range, the inner plates 51X and 51Y are both kept at the positions of the normal mode, and thus the transmission torque is small.

Next, when the relative rotational speed in the direction of forward rotation increases, the shearing force that acts on the inner plate 51X increases. Accordingly, the clockwise moment generated by the shearing force increases gradually, and when the clockwise moment exceeds the counterclockwise moment generated by the biasing force of the tension coil spring 6a, the inner plate 51X is displaced outward, and the mode transitions to the high torque mode shown in FIG. 10. In the diagram, the white arrow indicates the direction of rotation of the case member 2.

Figure 10:
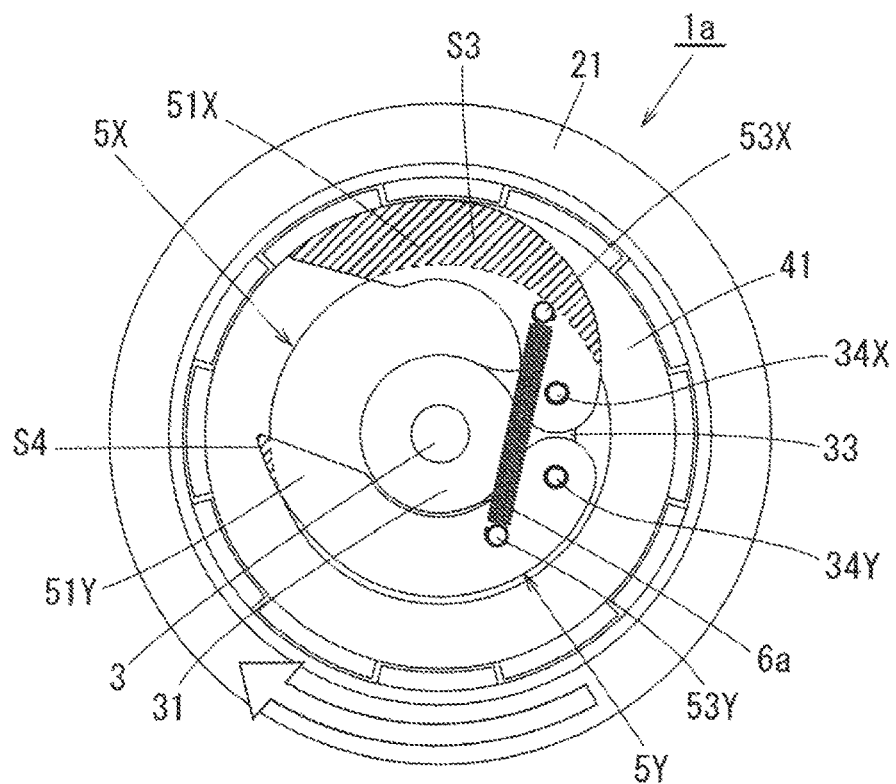
FIG. 10 is a front view of the torque transmission apparatus according to the second embodiment of the present invention in the high torque mode when a case member is relatively rotated clockwise with respect to a shaft.
Figure 11:
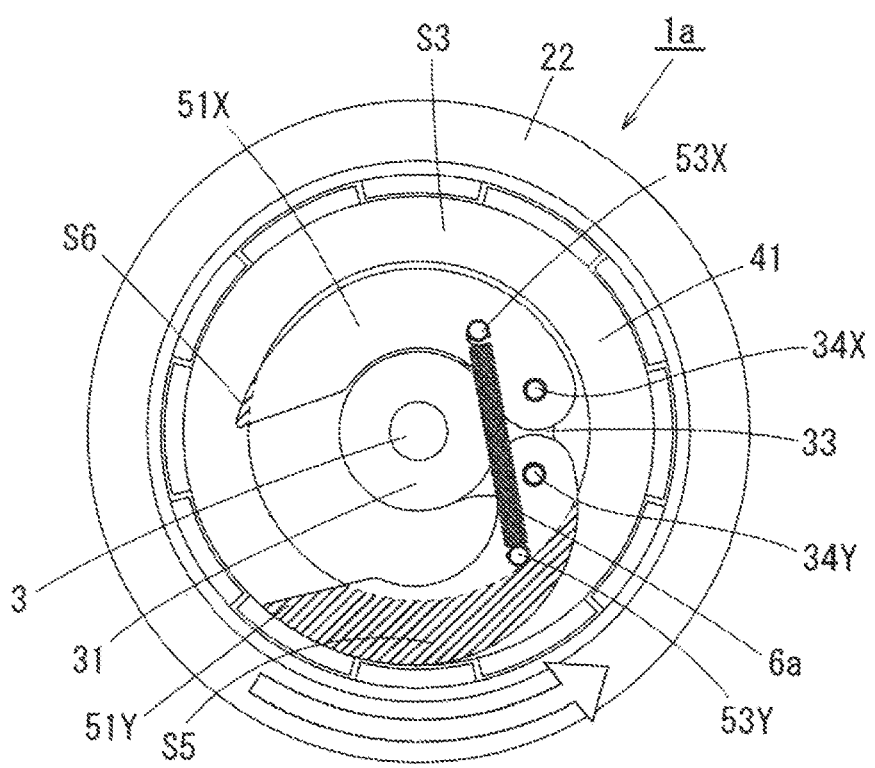
FIG. 11 is a front view of the torque transmission apparatus according to the second embodiment of the present invention in the high torque mode when the case member is relatively rotated counterclockwise with respect to the shaft.

As shown in FIG. 10, the inner plate 51Y is not displaced. This is because, as described above, in the case of forward rotation, the two moments that act on the inner plate 51Y both act in a direction to press the inner plate 51Y against the cylindrical side surface of the hub 31.

In the high torque mode for forward rotation, because an interlocking area S3 (indicated by hatching) is large, a large shearing force acts between the outer plate 41 and the inner plate 51X. Accordingly, the transmission torque produced between the shaft 3 and the case member 2 takes a large value surpassing the amount of increase in transmission torque caused by simply increasing the shear rate of the fluid.

Next, the transition from the high torque mode to the normal mode will be described. In the high torque mode for forward rotation, when the relative rotational speed decreases, the shear rate of the fluid decreases, as a result of which the shearing force that biases the inner plate 51X clockwise decreases as the transmission torque decreases. Then, when the counterclockwise moment generated by the tension coil spring 6a exceeds the clockwise moment generated by the shearing force, displacement of the inner plate 51X in the direction of the axis of the shaft 3 starts.

When a state in which the relative rotational speed is low continues, due to the biasing force of the tension coil spring 6a, the inner plate 51X is returned to a state in which the inner curved surface abuts against the cylindrical side surface of the hub 31. As described above, when the relative rotational speed decreases, the mode returns to the normal mode in which the transmission torque is small.

On the other hand, in the case of backward rotation in which the case member 2 relatively rotates counterclockwise with respect to the shaft 3, conversely to the case of relative rotation in the direction of forward rotation, only the inner plate 51Y is displaced, and transition is made between the normal mode (FIG. 9) and a high torque mode for backward rotation (FIG. 11), and the inner plate 51X remains abutted against the cylindrical side surface of the hub 31 and is not displaced.

As described above, in the present embodiment, because two second plate members 5X and 5Y are provided so as to be plane symmetric with respect to the plane including the axis of the shaft 3, in the case of forward rotation, the second plate member 5X is displaced to make a transition to the high torque mode for forward rotation, and in the case of backward rotation, the second plate member 5Y is displaced to make a transition to the high torque mode for backward rotation. As a result, with relative rotation in both forward and backward rotation directions, it is possible to achieve a large transmission torque surpassing the amount of increase in transmission torque increased by simply increasing the shear rate of the fluid in the high differential motion range.

In the present embodiment, two second plate members 5X and 5Y are provided at a pitch of 180 degrees, but the configuration is not limited thereto. For example, four second plate members 5 may be provided at a pitch of 90 degrees. In this case, second plate members 5X and 5Y for forward rotation and backward rotation may be alternately provided, or two second plate members for forward rotation and two second plate members for backward rotation may be provided sequentially.

Third Embodiment

A torque transmission apparatus according to a third embodiment of the present invention will be described with reference to FIGS. 12 and 13.

Figure 12:
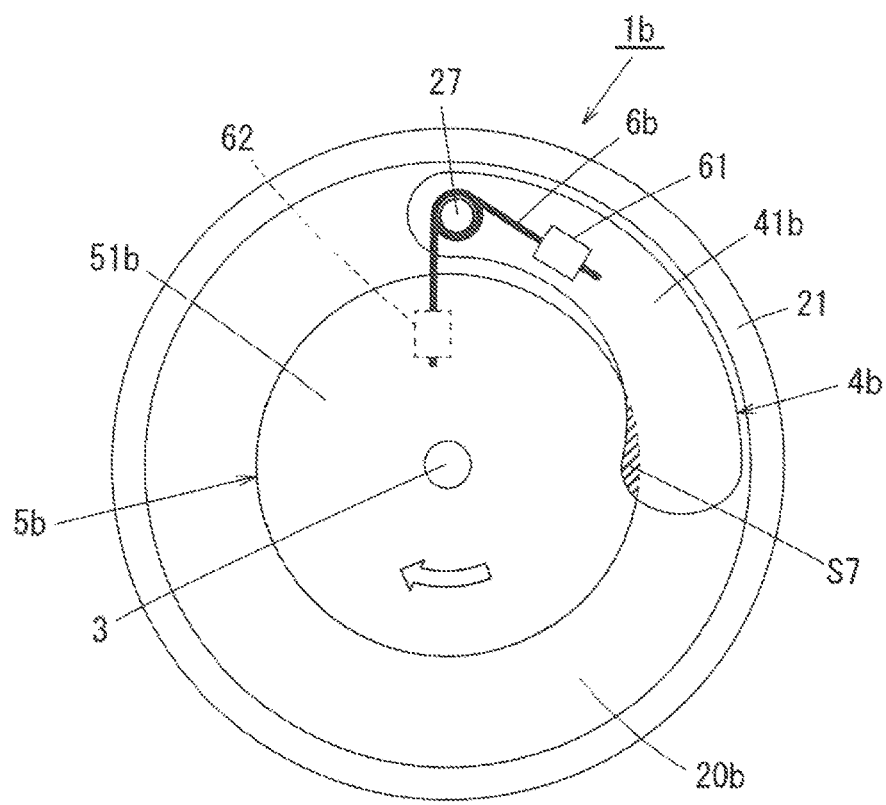
FIG. 12 is a schematic front view of a torque transmission apparatus according to a third embodiment of the present invention in the normal mode.

FIG. 12 is a schematic cross-sectional view of a torque transmission apparatus 1b according to the present embodiment in the normal mode. Likewise, FIG. 13 is a schematic cross-sectional view of the torque transmission apparatus 1b in the high torque mode. As in FIG. 1, in order to clearly illustrate the internal structure, a state is shown in which the cap 22 and the O-ring 23 are removed. The description will be given assuming that the shaft 3 relatively rotates in a direction indicated by the white arrow shown in the diagrams.

The first and second embodiments described above are both configured such that the inner plates 51 of the second plate members 5 connected to the shaft 3 swing and the outer plates 41 of the first plate member 4 are fixed to the case member 2.

In contrast, in the present embodiment, unlike the first and second embodiments, a configuration is used in which inner plates 51b that constitute a second plate member 5 are fixed to the shaft 3, and outer plates 41b that constitute a first plate member 4b connected to the case member 2 swing.

In the present embodiment, as in the first and second embodiments, transmission torque can be generated between the shaft 3 and the case member 2 by a shearing force generated in the viscous fluid between the outer plates 41b and the inner plates 51b.

Figure 13:
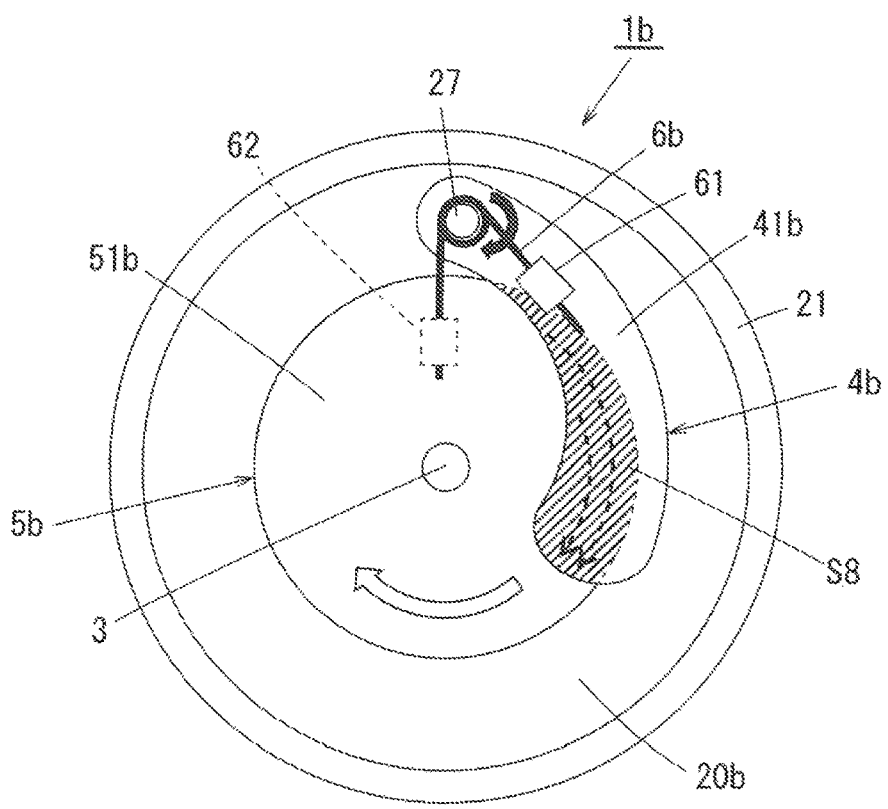
FIG. 13 is a schematic front view of the torque transmission apparatus according to the third embodiment of the present invention in the high torque mode.

As shown in FIGS. 12 and 13, in a differential chamber 20b, the disk-shaped inner plate 51b that constitutes the second plate member 5b is fixed to the shaft 3, vertical to the axis of the shaft 3. Accordingly, the second plate member 5b can be rotated integrally with the shaft 3, or can be kept in a stationary state.

On the other hand, a swing shaft 27 is provided at a position in the operation chamber 20b that is radially outside the outer edge of the second plate member 5b, so as to be parallel to the axis of the shaft 3. The outer plate 41b that constitutes the first plate member 4b has a substantially arc shape, and a swing shaft insertion hole through which the swing shaft 27 is inserted is formed at an end portion of the outer plate 41b. The swing shaft 27 is supported at two ends by the bottom surface of the case 21 and the cap 22, and as a result of the swing shaft 27 being passed through the swing shaft insertion hole between the bottom surface of the case 21 and the cap 22, the outer plate 41b is swingably supported.

The substantially arc-shaped outer curved surface of the outer plate 41b has a radius of curvature that is substantially equal to the radius of curvature of the inner surface of the cylindrical wall of the case 21, and in the normal mode shown in FIG. 12, the outer plate 41b is biased by a torsion spring 6b, which is an elastic member, such that these curved surfaces abut against each other. The torsion spring 6b includes, at the center, a coil portion through which the swing shaft 27 is inserted. One of the arms of the torsion spring 6b is fixed to the outer plate 41b by a spring hook 61, and the other arm is fixed to the cap 22 (see FIG. 2) by a spring hook 62.

In the installation state shown in FIG. 12, the torsion spring 6b is held such that the two arms form an angle smaller than that when the two arms are wide open. Accordingly, in the normal mode, the outer plate 41b is biased in the direction toward the first position by the torsion spring 6b.

In the normal mode, an end portion (leading end portion) of the outer plate 41b that is opposite to the swing shaft 27 is interlocked with the inner plate 51b, and in the other portion that is close to the swing shaft 27, the substantially arc-shaped inner curved surface is positioned radially outside the outer edge of the inner plate 51b.

Accordingly, during transition from the normal mode to the high torque mode, a shearing force generated in the outer plate 41b in an interlock portion S7 (indicated by hatching in FIG. 12) effectively generates a moment about the swing shaft 27 for displacing the outer plate 41b to the second position at which the interlocking area is large, and also the transmission torque can be reduced by reducing the shearing force in the normal mode. The reason is as follows. At the position at which the outer plate 41b and the inner plate 51b are interlocked, the shearing force acts on the inner plate 51b in a direction of the tangent line direction of a circle centered on the axis of the shaft 3. When a portion of the outer plate 41b that is close to the swing shaft 27 is in an interlocked state, at that portion, the moment generated by the shearing force acts in a direction to bias the outer plate 41b in the direction toward the first position. However, if that portion is not interlocked, it is possible to suppress the occurrence of a shearing force that biases the outer plate 41b in the direction toward the first position.

Next, the transition between the normal mode and the high torque mode will be described. In the normal mode shown in FIG. 12, when the relative rotational speed increases, the shearing force that is generated by the viscosity of the fluid and acts on the outer plate 41b increases, which increases the moment about the swing shaft 27 that displaces the outer plate 41b in the direction toward the second position. When this moment exceeds the moment generated by the biasing force of the torsion spring 6b, displacement of the outer plate 41b in the direction toward the second position starts.

Along with the displacement of the outer plate 41b, the shearing forces increases as an interlocking area S8 between the inner plate 51b and the outer plate 41b increases, and the moment that biases the outer plate 41b in the direction toward the second position also increases. Accordingly, after displacement has started, the outer plate 41b is rapidly displaced to a position that is restricted by a stopper (not shown), and the mode transitions to the high torque mode shown in FIG. 13, where the transmission torque increases rapidly.

In the high torque mode, when the relative rotational speed decreases, the moment that is generated by the shearing force and biases the outer plate 41b in the direction toward the second position decreases. As a result, the moment that is generated by the biasing force of the torsion spring 6b and biases the outer plate 41b in the direction toward the first position dominates, and the mode returns to the normal mode.

In the present embodiment, by configuring the outer plate 41b to have a shape as described above, in the normal mode, the transmission torque can be minimized. Also, when used as a braking apparatus for a walking rollator, a wheelchair or the like, the walking rollator or the wheelchair can travel with less power during normal travel, and can be reliably braked during travel at an excessive speed.

However, the configuration described above may not be used when used as a power transmission apparatus that requires a certain degree of transmission torque even in the normal mode. That is, when both the swing shaft 27-side portion and the leading end portion of the outer plate 41b are interlocked, even if a shearing force generated in the swing shaft 27-side portion and a shearing force generated in the leading end portion are about the same, the distance between the line of action of the shearing force and the swing shaft 27 is longer on the leading end portion side, and thus the moment about the swing shaft 27 that displaces the outer plate 41b in the direction toward the second position dominates. Accordingly, even when the swing shaft 27-side portion of the outer plate 41b is interlocked with the inner plate 51b, the outer plate 41b can be displaced to the second position by an increase in the relative rotational speed although the relative rotational speed that starts to displace the outer plate 41b in the second position becomes large.

Fourth Embodiment

A torque transmission apparatus according to a fourth embodiment of the present invention will be described with reference to FIGS. 14 to 17.

In the first to third embodiments described above, as the first and second plate members, plate members in each of which a plurality of outer plates or inner plates are provided at a predetermined pitch are used. However, in the present embodiment, as the first and second plate members, plate members in each of which a plurality of ring-shaped plates having different diameters are concentrically provided at a predetermined pitch are used.

Also, the first to third embodiments are configured such that the torque generated between the case member and the shaft is controlled by switching the interlocking area between plates by pivotally moving the outer plates or the inner plates. However, the present embodiment is configured such that the interlocking area between plates is switched by moving the second plate member in the axial direction of the shaft with respect to the first plate member. As a means for achieving this, a motion conversion means that converts the rotary motion of the shaft to a rectilinear motion of the second plate member is provided in the present embodiment.

Figure 14:
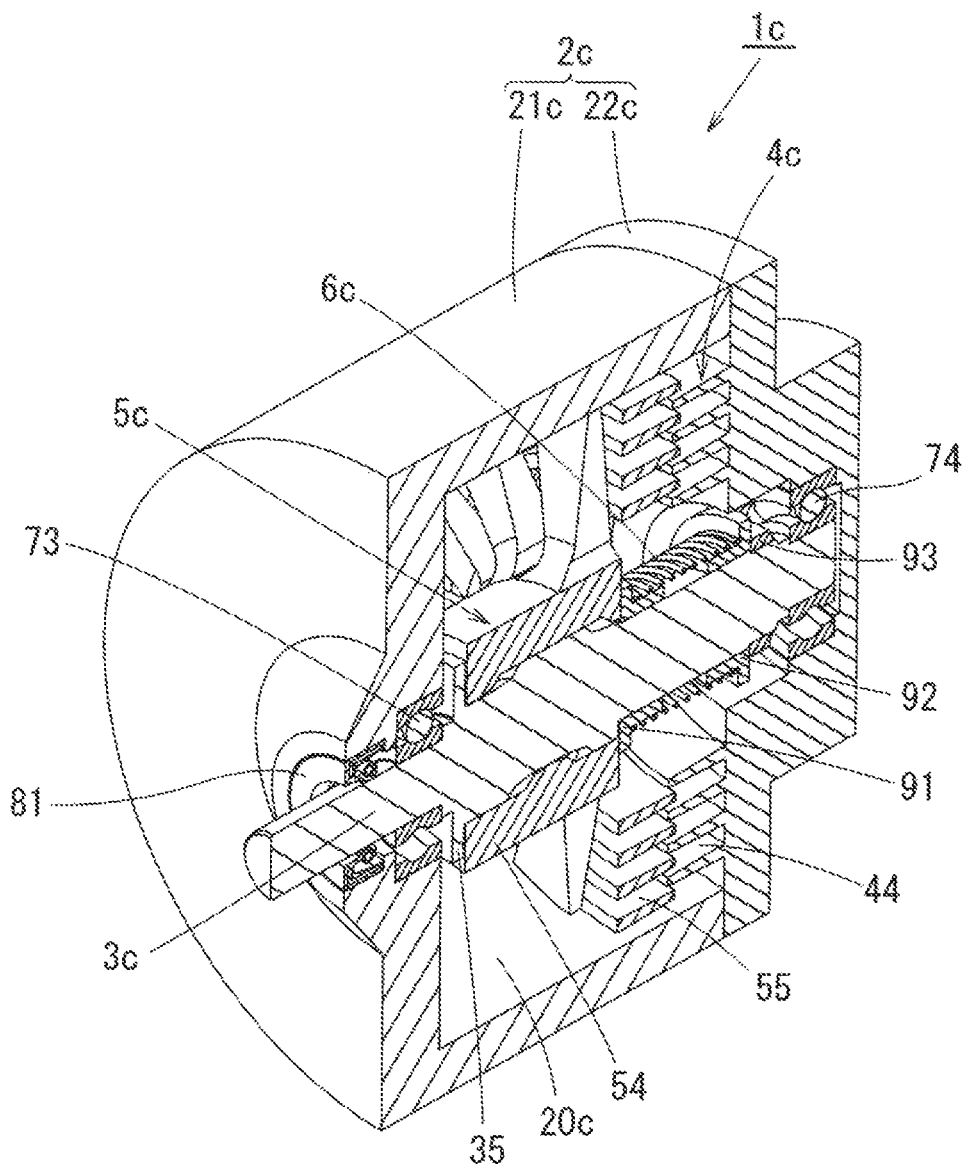
FIG. 14 is a perspective view of a torque transmission apparatus according to a fourth embodiment of the present invention, which is cut in half along the axis of a shaft.
Figure 15:
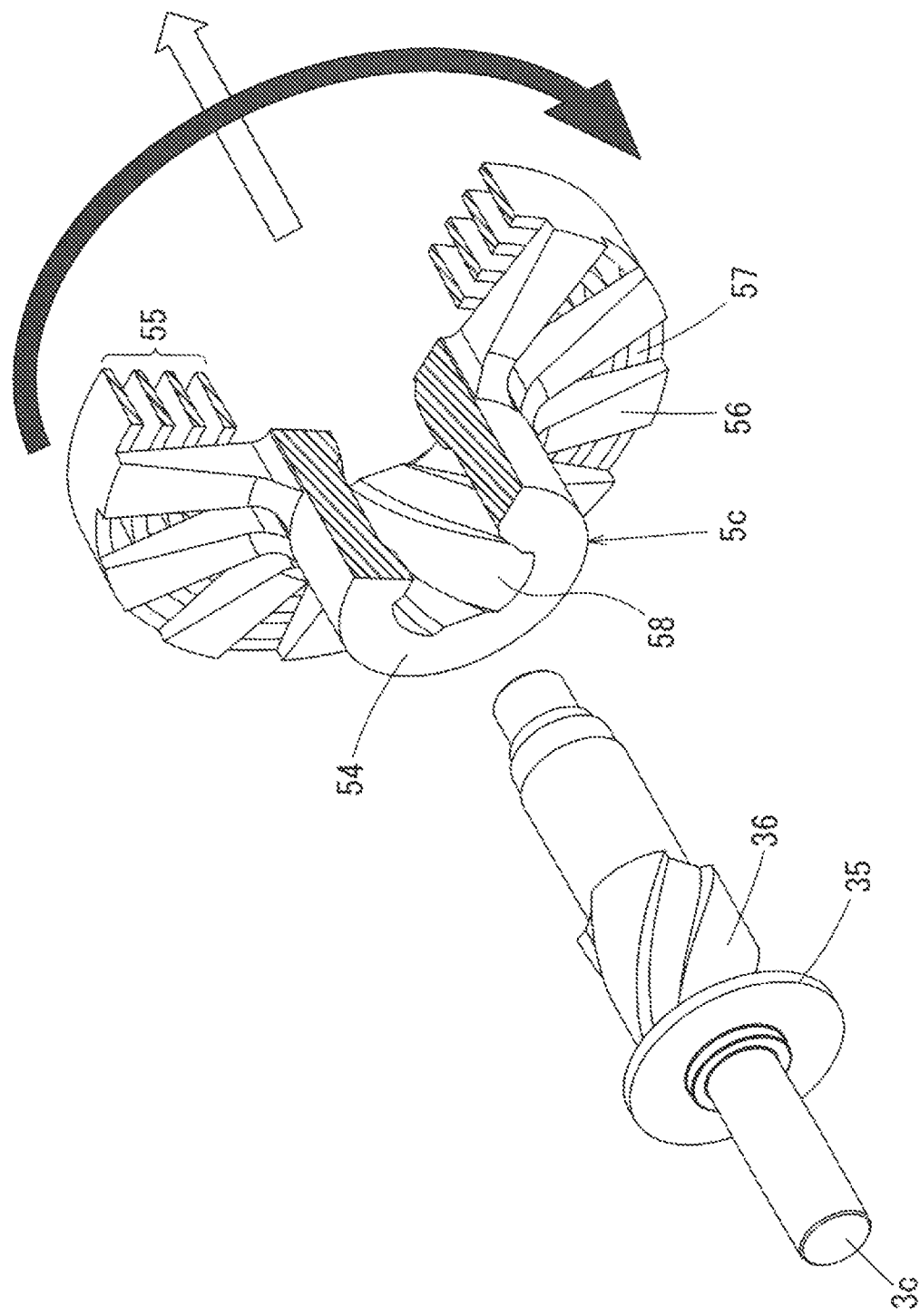
FIG. 15 is a partially cutaway perspective view showing an exploded state of the shaft and a second plate member of the fourth embodiment.
Figure 16:
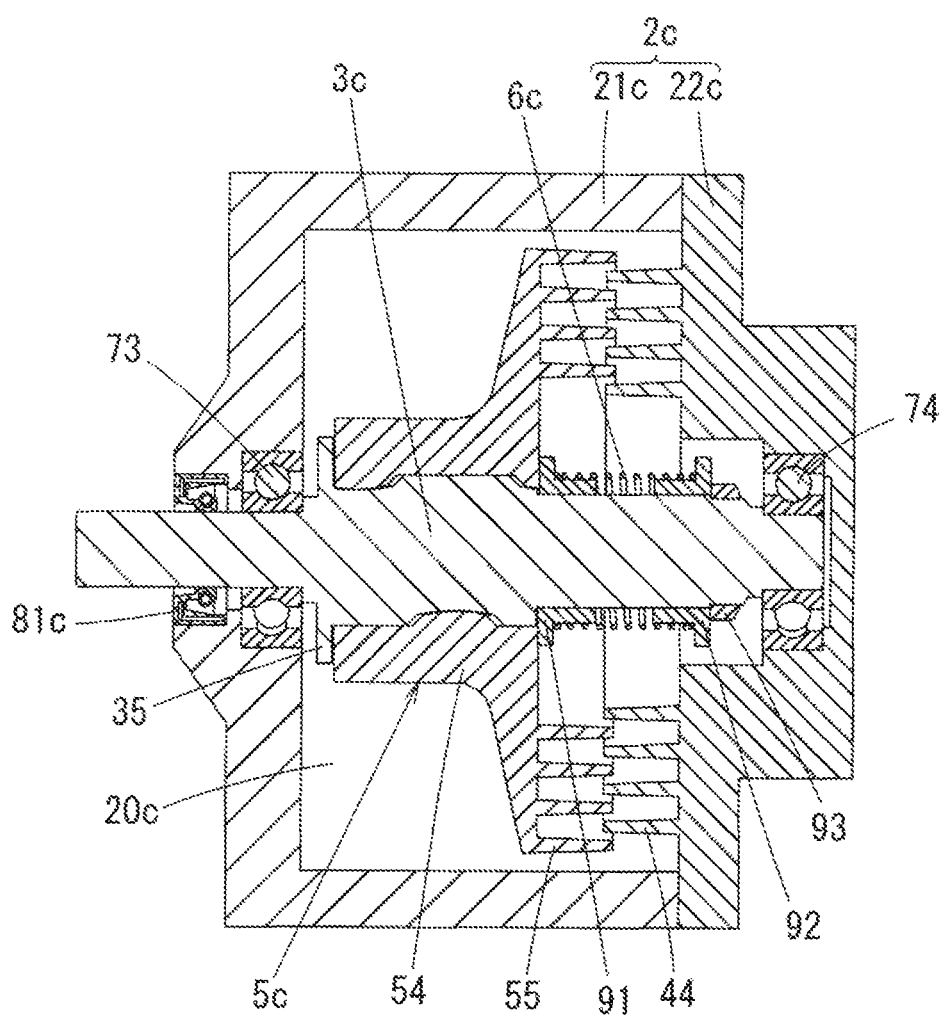
FIG. 16 is a cross-sectional view of the torque transmission apparatus in the normal mode.
Figure 17:
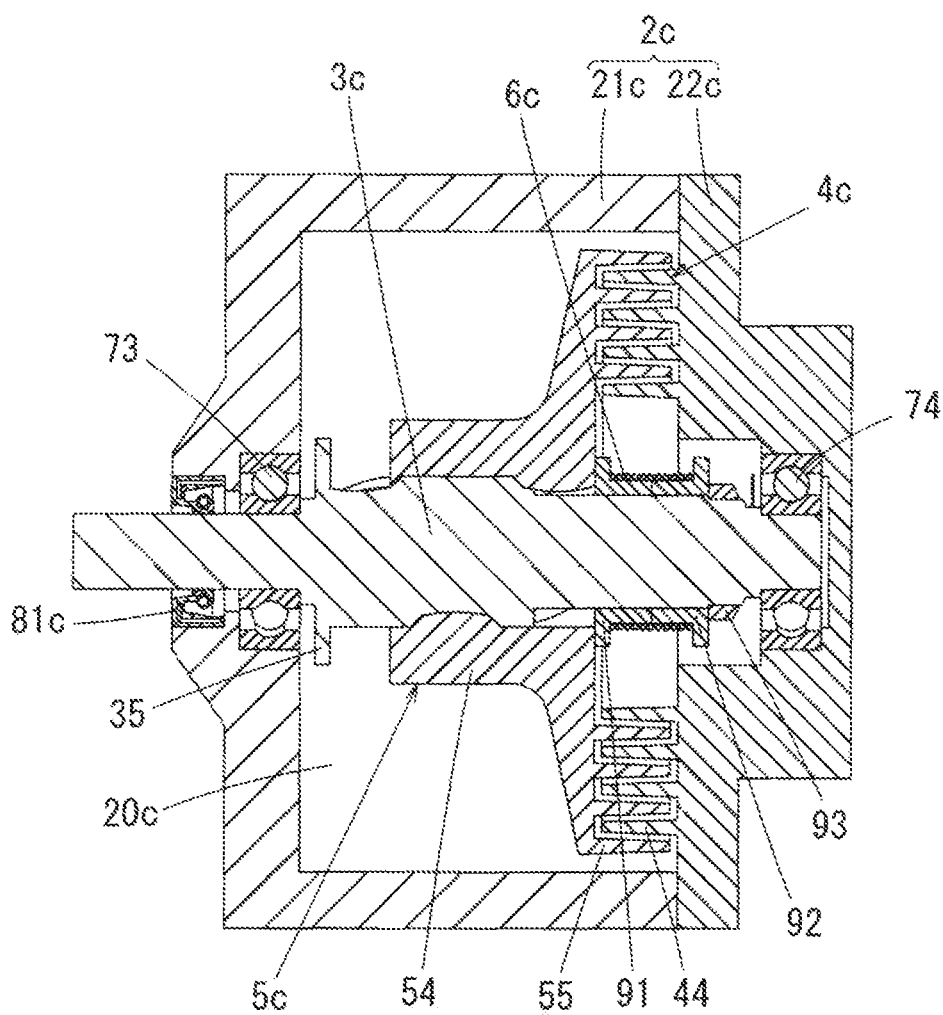
FIG. 17 is a cross-sectional view of the torque transmission apparatus in the high torque mode.

FIG. 14 is a perspective view of a torque transmission apparatus 1c according to the present embodiment, which is cut in half along the axis of the shaft 3. FIG. 15 is a partially cutaway perspective view showing an exploded state of a shaft 3c including an external thread on its side surface and a second plate member 5c including an internal thread that is threadedly engageable with the external thread. Furthermore, FIGS. 16 and 17 are cross-sectional views of the torque transmission apparatus 1c including the axis of the shaft 3c in the normal mode and the high torque mode, respectively.

As shown in FIG. 14, a case member 2c of the torque transmission apparatus 1c according to the present embodiment is composed of, as in other embodiments, a case 21c that has a substantially cylindrical shape and a bottom surface, and a disk-shaped cap 22c that closes an open face of the case 21c, and is internally provided with an operation chamber 20c.

The case member 2c includes, in the operation chamber 20c, a first plate member 4c that is integrally molded with the case member 2c and a second plate member 5c that is rotated integrally with and relatively with respect to the shaft 3c, and a viscous fluid such as a silicon oil is contained in the void of the operation chamber 20c. The description of the sealing and the fastening means of the joint face between the case 21c and the cap 22c is omitted here.

The shaft 3c is supported by a bearing housing provided between the center of the bottom surface of the circular case 21c and the center of the cap 22c via ball bearings 73 and 74 so as to be capable of rotating relative to the case member 2c. As in other embodiments, torque transmission occurs between the shaft 3c and the case member 2c that rotate relative to each other via the contained viscous fluid.

As shown in FIG. 14, the present embodiment is configured such that the end of the shaft 3c that is on the cap 22c side does not pass through the cap 22c, and thus the oil seal 81 may be provided only on the case 21c side.

Next, the configuration and function of each member of the present embodiment will be described. The first plate member 4c in which a plurality of ring-shaped plates (first plates) 44 are concentrically provided at a predetermined pitch about the axis of the shaft 3c is provided on the inner surface of the cap 22c. In the present embodiment, the first plate member 4c is integrally molded with the cap 22c. However, a disk in which ring-shaped plates 44 are concentrically provided may be prepared as a separate member and fastened to the cap 22c so as to be incapable of relative rotation.

Next, the second plate member 5c that is rotated integrally with and relatively to the shaft 3c will be described. In the second plate member 5c, a plurality of ring-shaped plates (second plates) 55 that are concentrically provided about the axis of the shaft 3c are connected to each other by plate connecting ribs 56 protruding radially from the cylindrical side surface of a nut portion 53, the plurality of ring-shaped plates 55 having a thickness and an interval that allows interlocking with the ring-shaped plates 44 of the first plate member 4c (see FIG. 15).

In the shaft 3c and a nut portion 54 of the second plate member 5c, a motion conversion means that converts the relative rotary motion between the shaft 3c and the second plate member to a rectilinear motion in the axial direction of the second plate member 5c is incorporated. The motion conversion means is composed of an external thread 36 that is formed on the outer circumferential surface of the shaft 3c and an internal thread 58 that is formed on the inner circumferential surface of the nut portion 54 of the second plate member 5c.

Specifically, the external thread 36 formed on the outer circumferential surface of the shaft 3c and the internal thread 58 formed on the inner circumferential surface of the nut portion 54 are threadedly engaged, and the viscous fluid contained in the operation chamber 20c functions as a lubricant. Accordingly, when a force in the axial direction is applied between the shaft 3c and the second plate member 5c, the second plate member 5c makes a rectilinear motion by sliding in the axial direction while relatively rotating. Conversely, when torque about the axis is applied between the shaft 3c and the second plate member 5c, the second plate member 5c relatively rotates while sliding in the axial direction.

As shown in FIG. 16, in the normal mode, the second plate member 5c is biased toward the bottom surface of the case 21c by a compressible coil spring 6c (hereinafter referred to simply as "coil spring 6c") that is an elastic member, and is held abutted against a stopper 35 that is integrally provided on the shaft 3c so as to limit the range of movement of the second plate member 5c.

A nut-side spring guide 91 and a shaft-side spring guide 92 that have a cylindrical shape and a flange are fitted between the coil spring 6c and the shaft 3c.

The nut-side spring guide 91 has such a clearance that the inner diameter thereof can slide along the shaft 3c, and also has such a clearance that the outer diameter thereof does not affect expansion and contraction of the coil spring 6c while maintaining the attitude of the coil spring 6c. Also, the flange surface is configured to abut against a surface of the nut portion 54 of the second plate member 5c that is perpendicular to the rotational axis so as to transfer the force of the coil spring 6c to the nut portion 54.

The shaft-side spring guide 92 has the same shape as that of the nut-side spring guide 91, but the attitude in the axial direction is the opposite. The flange surface is biased in a direction to compress the coil spring 6c by a set collar 93 that is fixed to the shaft 3c. Accordingly, in the normal mode, the ring-shaped plates 55 that constitute the second plate member 5c are biased toward the bottom surface of the case 21c (toward the left side in FIG. 16) by the coil spring 6c, and thus a state in which the overlapping area with the ring-shaped plates 44 that constitute the first plate member 4c is small is maintained.

On the other hand, when the case member 2c relatively rotates in a direction indicated by the black arrow shown in FIG. 15, due to the shearing force that acts on the second plate member 5c, a torque in the same direction as the relative rotation of the case member 2c is also generated in the second plate member 5c, and as indicated by the white arrow in FIG. 15, a force in the axial direction that is directed toward the cap 22c is generated in the second plate member 5c by the motion conversion means that is provided in the shaft 3c and the second plate member 5c.

In the low differential motion range in which the relative rotational speed is low, the force in the axial direction is smaller than the biasing force generated by the coil spring 6c, and thus the normal mode shown in FIG. 16 is maintained.

The force in the axial direction increases as the relative rotational speed increases, and when the force in the axial direction exceeds the biasing force generated by the coil spring 6c, the mode transitions to the high torque mode shown in FIG. 17. At this time, the shaft-side spring guide 92 and the nut-side spring guide 91 described above abut against each other at their cylindrical end surfaces, and function as a stopper that limits the range of movement of the second plate member 5c on the second position side.

In the high torque mode, as shown in FIG. 17, the interlocking area between the ring-shaped plates 44 of the first plate member 4c and the ring-shaped plates 55 of the second plate member 5c is large, and the shearing force taken on by both plates from the fluid is large, and thus the transmission torque between the shaft 3c and the case member 2c increases more than the increase in the rotation speed in the normal mode.

Also, if each ring-shaped plate of the second plate member 5c and the first plate member 4c is configured such that the cross section has a tapered shape that is thick at the bottom and is thin at the leading end, in addition to the increase in the overlapping area between the plates, an increase in the velocity gradient of the viscous fluid caused by the reduction in the amount of fluid between the plates causes a more significant increase in the shearing force. In this case, the stroke of the second plate member 5c required to transition from the normal mode to the high torque mode can be shortened, which helps to improve responsiveness to the transition.

In the high torque mode, when the relative rotational speed decreases to reduce the shearing force, and the biasing force of the coil spring 6c exceeds the force in the axial direction acting on the second plate member 5c due to the shearing force, the second plate member 5c moves in a direction toward the bottom surface of the case 21c, and the mode returns to the normal mode.

During transition between the normal mode and the high torque mode, as shown in FIG. 15, the fluid can move in a direction parallel to the shaft by passing through flow spaces 57 between adjacent plate connecting ribs 56, and thus the operation of the second plate member 5c in the axial direction can be performed smoothly.

As in the first embodiment, the present embodiment is configured such that the direction of relative rotation that makes transition to the high torque mode is only one direction, and in the case of rotation in the opposite direction, transition to the high torque mode is not made even in the high differential motion range.

In the embodiments described above, the viscous fluid contained in the operation chamber may be any viscous liquid, and is preferably an oil having lubrication properties, and is particularly preferably a mineral oil. This is because the viscous fluid functions as a lubricant even when a lubricant is not supplied to the shaft, the bearing portions, and sliding surfaces of the first and second plate members, and other portions in the operation chamber that require lubrication.

Furthermore, the use of silicon oil whose viscosity is stable irrespective of temperature is preferable because even when there is a change in the environmental temperature, or there is a temperature increase due to friction of the fluid, stable transmission of torque is possible. It is preferable that the operation chamber is filled with the viscous fluid, but the filling rate does not need to be 100% as long as it is possible to transmit the torque and operate the movable plates.

The viscosity of the viscous fluid affects the characteristics of transmission torque and the relative rotational speed (hereinafter referred to as "transition speed") at which transition is made to the high torque mode. When the viscosity is low, the transmission torque is small, and the transition speed is high. The opposite applies when the viscosity is high.

However, the factor that affects the transmission torque and the transition speed includes, other than viscosity, design elements such as the shape, interval, and interlocking area of the first and second plate members, and the physical properties of the elastic members. In order to implement the intended torque characteristics and transition speed, the viscosity of the viscous fluid may be selected according to these design elements.

For example, in the case where the torque transmission apparatus is used in a braking apparatus for limiting the speed of a walking rollator or a wheelchair, it is preferable that, in the normal mode, the transmission torque is as small as possible so that the walking rollator or the wheelchair can travel with a light force. In the case where a fluid with low viscosity is used, the shearing force can be reduced, and the transmission torque can be reduced, but the transition speed increases. To address this, when the transition speed is too high, by changing the spring constant or set length of the elastic member so as to reduce the biasing force, the transition speed can be lowered.

Also, the viscosity of the viscous fluid affects the transmission torque in the same manner in both the normal mode and the high torque mode. Here, in the case where a high transmission torque is required in the high torque mode while a low transmission torque is used in the normal mode, for example, the shape and dimensions of both plates may be determined such that the interlocking area in the high torque mode increases while using a viscous fluid with low viscosity.

Also, when each plate of the first plate member and/or the second plate member is configured to have a tapered shape that is thin at the leading end portion and is thick at the bottom, in addition to the interlocking area, the thickness (plate interval) of the viscous fluid filled between both plates also varies, and thus the torque difference between the normal mode and the high torque mode can be increased.

Conversely, in the case where it is necessary to reduce the transmission torque to be small in the high torque mode, in addition to the shape and dimensions of the plates, a stopper that limits the range of movement of the movable plates at the second position may be used to limit the interlocking area such that the interlocking area does not increase.

Also, in the case where the torque transmission apparatus according to the present invention is used as a power transmission apparatus, and a certain degree of transmission torque is required even in the normal mode, the interlocking area at the first position may be set to be large.

Also, in order to fluctuate the transmission torque in the same direction in the two modes, the number of plates that constitute the first and second plate members may be changed. Alternatively, it is also possible to change the dimension of the gap that is formed between the first plate member and the second plate member and filled with the viscous fluid.

As described in detail above, the torque transmission apparatus according to the present invention amplifies a change in the transmission torque generated by the relative rotational speed by changing the interlocking area by using the shearing force of the viscous fluid generated as a result of the case member and the shaft rotating relative to each other. Accordingly, the present embodiment has an advantage different from, for example, the advantage of the braking apparatus disclosed in JP 2013-148183 that attempts to produce the same effect by using centrifugal force. That is, the mode can transition between the normal mode and the high torque mode depending on the relative rotational speed between input and output shafts, and the dependency on absolute rotational speed is low.

Accordingly, irrespective of whether the driving side is the shaft or the case member, the mode can transition at the same relative rotational speed. For example, in a vehicle braking apparatus that includes the torque transmission apparatus according to the present invention, a brake is applied at the same rotation speed as when the shaft is fixed, and the case member is provided on the wheel side, or vice versa.

Also, in the case where the torque transmission apparatus according to the present invention is used as a viscous coupling for a part-time four-wheel-drive vehicle, because a centrifugal force is not used, the mode can transition based on the relative rotational speed that is generated by skidding of front wheels independent of the absolute rotational speed, or specifically, the vehicle speed.

Hereinafter, preferred examples of the embodiment of the present invention will be collectively described.

In the first torque transmission apparatus according to present invention, it is preferable that, when the second plates are the movable plates, the first plates are attached to an inner circumferential surface of the case member, and the movable plates are swingably supported about a position at a distance from the rotational axis of the shaft, the movable plates are held at the first position, at which the interlocking area between the first plates and the movable plates is small, by the elastic member when a relative rotational speed between the case member and the shaft is small, and, when the relative rotational speed between the case member and the shaft exceeds a predetermined value, are pivotally moved toward the first plates by the shearing force of the viscous fluid and held at the second position at which the interlocking area between the movable plates and the first plates is large.

Also, it is preferable that a pair of the movable plates are provided so as to have rotational symmetry with respect to the rotational axis of the shaft, or a pair of the movable plates are provided so as to have plane symmetry with respect to a plane including the rotational axis of the shaft.

Also, it is preferable that a tension coil spring or a torsion spring is used as the elastic member.

Also, it is preferable that, when the first plates are the movable plates, the movable plates are swingably supported about a position at a distance from an inner circumferential surface of the case member, and the second plates are attached to an outer circumferential surface of the shaft, the movable plates are held at the first position, at which the interlocking area between the movable plates and the second plates is small, by the elastic member when a relative rotational speed between the case member and the shaft is small, and, when the relative rotational speed between the case member and the shaft exceeds a predetermined value, are pivotally moved toward the second plates by the shearing force of the viscous fluid and held at the second position at which the interlocking area between the movable plates and the second plates is large.

In the second torque transmission apparatus according to the present invention, it is preferable that the movable plates are held at the first position, at which the interlocking area between the first plates and the movable plates is small, by the elastic member when a relative rotational speed between the case member and the shaft is small, and, when the relative rotational speed between the case member and the shaft exceeds a predetermined value, are moved toward the first plates by the shearing force of the viscous fluid and held at the second position at which the interlocking area between the movable plates and the first plates is large.

Although the present invention has been fully described by way of example with reference to the accompanied drawings, it is to be understood that various changes and modifications will be apparent to those skilled in the art.

Therefore, unless otherwise such changes and modifications from the scope of the present invention hereinafter defined, they should be construed as being included therein.

What is claimed is:

1. A torque transmission apparatus that generates torque corresponding to a relative rotational speed between two shafts by using a shearing force of a viscous fluid so as to reduce a speed difference, the torque transmission apparatus comprising:
    a case member that forms an operation chamber that contains the viscous fluid;
    a shaft that is inserted through the case member so as to be capable of rotating relative to the case member;
    a plurality of first plates that are connected to the case member; and
    a plurality of second plates that are connected to the shaft and provided spaced apart from the first plates in a thickness direction,
    wherein the second plates are movable plates capable of swinging within a plane perpendicular to an axis of the shaft,
    the first plates are attached to an inner circumferential surface of the case member, and the movable plates are swingably supported about a position at a distance from the rotational axis of the shaft,
    the movable plates are held at a first position, at which the interlocking area between the first plates and the movable plates is small, by the elastic member when a relative rotational speed between the case member and the shaft is small, and
    when the relative rotational speed between the case member and the shaft exceeds a predetermined value, the movable plates are pivotally moved toward the first plates by the shearing force of the viscous fluid generated between plates by relative rotation, and held at a second position at which the interlocking area between the movable plates and the first plates is large, so as to switch an interlocking area between the plates and control a value of torque generated between the case member and the shaft.

2. The torque transmission apparatus according to claim 1, wherein a pair of the movable plates are provided so as to be plane symmetric with respect to a plane including the rotational axis of the shaft.

3. The torque transmission apparatus according to claim 1, wherein a tension coil spring is used as the elastic member.

4. A braking apparatus comprising a torque transmission apparatus that generates torque corresponding to a relative rotational speed between two shafts by using a shearing force of a viscous fluid so as to reduce a speed difference, the torque transmission apparatus comprising:
    a case member that forms an operation chamber that contains the viscous fluid;
    a shaft that is inserted through the case member so as to be capable of rotating relative to the case member;
    a plurality of first plates that are connected to the case member; and
    a plurality of second plates that are connected to the shaft and provided spaced apart from the first plates in a thickness direction,
    wherein the second plates are movable plates capable of swinging within a plane perpendicular to an axis of the shaft, and
    the first plates are attached to an inner circumferential surface of the case member, and the movable plates are swingably supported about a position at a distance from the rotational axis of the shaft,
    the movable plates are held at a first position, at which the interlocking area between the first plates and the movable plates is small, by the elastic member when a relative rotational speed between the case member and the shaft is small, and
    when the relative rotational speed between the case member and the shaft exceeds a predetermined value, the movable plates are pivotally moved toward the first plates by the shearing force of the viscous fluid generated between plates by relative rotation, and held at a second position at which the interlocking area between the movable plates and the first plates is large, so as to switch an interlocking area between the plates and control a value of torque generated between the case member and the shaft.

5. The braking apparatus according to claim 4, wherein a pair of the movable plates are provided so as to be plane symmetric with respect to a plane including the rotational axis of the shaft.

6. The braking apparatus according to claim 4, wherein a tension coil spring is used as the elastic member.

* * * * *